(12) United States Patent
Kitazawa et al.

(10) Patent No.: US 6,174,093 B1
(45) Date of Patent: Jan. 16, 2001

(54) MOTOR-DRIVEN SINGLE-LENS REFLEX CAMERA AND MOTOR-DRIVEN SINGLE-LENS REFLEX CAMERA FOR SELF-FEEDING FILM CARTRIDGE

(75) Inventors: Toshiyuki Kitazawa; Tomoaki Itabashi, both of Saitama-ken (JP)

(73) Assignee: Asahi Kogaku Kogyo Kabushiki Kaisha, Tokyo (JP)

(*) Notice: Under 35 U.S.C. 154(b), the term of this patent shall be extended for 0 days.

(21) Appl. No.: 09/090,257

(22) Filed: Jun. 4, 1998

(30) Foreign Application Priority Data

Jun. 5, 1997 (JP) .................................................. 9-148319
Jun. 5, 1997 (JP) .................................................. 9-148320

(51) Int. Cl.[7] .................................................. G03B 17/42
(52) U.S. Cl. .......................... 396/358; 396/391; 396/402; 396/443
(58) Field of Search .................................. 396/387, 401, 396/402, 443, 358

(56) References Cited

U.S. PATENT DOCUMENTS

| 3,448,670 | 6/1969 | Suzuki . | |
|---|---|---|---|
| 3,598,034 | 8/1971 | Suzuki . | |
| 3,893,142 | 7/1975 | Arai . | |
| 3,895,389 | 7/1975 | Arai . | |
| 3,911,456 | 10/1975 | Umemura . | |
| 3,922,696 | 11/1975 | Arai . | |
| 4,042,942 | 8/1977 | Haraguchi . | |
| 5,070,349 | 12/1991 | Haraguchi . | |
| 5,105,212 | 4/1992 | Kitazawa . | |
| 5,150,141 | * 9/1992 | Uematsu | 396/358 |
| 5,253,004 | 10/1993 | Umetsu et al. . | |
| 5,274,407 | * 12/1993 | Haraguchi et al. | 396/406 |
| 5,646,711 | 7/1997 | Kitazawa et al. . | |
| 5,727,244 | 3/1998 | Kitazawa . | |
| 5,887,210 | * 3/1999 | Kitazawa et al. | 396/402 |

FOREIGN PATENT DOCUMENTS 8-10313    8/1989   (JP) .

* cited by examiner

Primary Examiner—W. B. Perkey
(74) Attorney, Agent, or Firm—Greenblum & Bernstein, P.L.C.

(57) ABSTRACT

A motor-driven single-lens reflex camera which controls and executes, through forward and reverse rotation of a single motor, a mirror up/down operation and a shutter charge operation by a mirror/shutter driving system, and also a film winding/rewinding operation by a film feeding system. The mirror up and the shutter charge release operations are executed through forward rotation of the motor, and the mirror down, the shutter charge and the film winding/rewinding operations are executed through reverse rotation of the motor. Thus the speedy film feeding after exposure can be made without stopping or reversing drive of the motor.

12 Claims, 27 Drawing Sheets

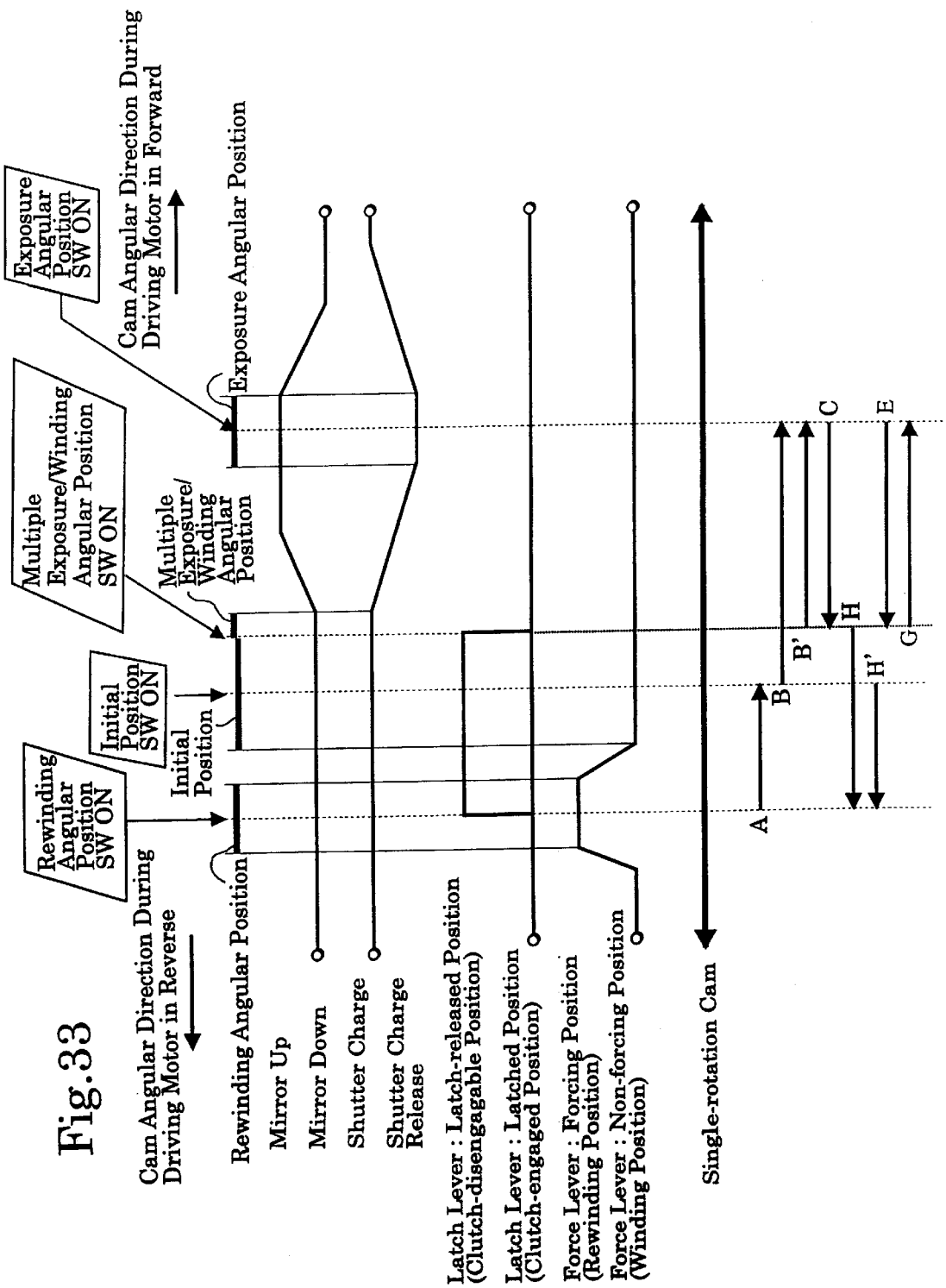

MOTOR-DRIVEN SINGLE-LENS REFLEX CAMERA AND MOTOR-DRIVEN SINGLE-LENS REFLEX CAMERA FOR SELF-FEEDING FILM CARTRIDGE

BACKGROUND OF THE INVENTION

1. Field of the Invention

The present invention relates to a motor-driven single-lens reflex camera and to a motor-driven single-lens reflex camera for self-feeding film cartridge, in which a single motor drives both a mirror/shutter system and a film feeding system.

2. Description of the Related Art

In regard to a motor-driven single-lens reflex camera constituting a motor to control an up/down operation of mirror and to carry out a shutter charge by driving a mirror/shutter driving system, and another motor to feed (wind) and rewind a film by driving a film feeding system, although it is possible to increase the speed of feeding of the film after exposure (namely, the frame feed speed), it is still difficult to minimize the size of camera because a larger space is required to mount two motors thereon, which further results in higher cost. Accordingly, there has been suggested a single-motor type of single-lens reflex camera, which drives both the mirror/shutter driving system and the film feeding system by the single motor, so that the minimumizing of space and cost of the camera can be accomplished. There are such type of cameras in the related art, for example, in which a film is fed by a sprocket capable of feeding by a regular angle, or in which a film is fed by driving a spool (Japanese unexamined patent publication No.1-202731, duly published after examination under No.8-10313). However, the related art makes the single motor carry out a plurality of tasks, thus transmission systems thereof may become complicated.

The camera of the above-mentioned related art carries out an up/down operation of a mirror and a shutter charge by rotation of a motor in one direction (forward direction), and a feed and a rewind of film by rotation of the motor in the opposite direction (reverse direction). In this structure, during a release operation, the motor is initially stopped after an operation of the mirror/shutter system, then the film is fed by the reverse rotation of the motor. Therefore the frame feed speed (the speed of film feed per frame) becomes slower, hence the camera is not suitable for sequential photographing.

In addition, although the single-motor type of single-lens reflex camera may minimize the size and cost of the camera, there are limitations to the various operation modes and faster driving speed due to complicated switching of driving directions. For example, it is difficult to operate at multiple exposures, which is different from ordinary photographing operations.

There is a camera complying with a new photographic system called "Advanced Photo System" which uses a self-feeding film cartridge. Under such a new system, since there are novel operations during loading of the film such as "film thrust" (setting the first film-frame) or "rewind write, (rewriting of magnetic data), that are not performed in regard to the conventional camera using 35 mm-type of film, it is difficult to control these novel operations by a single-motor type of single-lens reflex camera of the related art.

SUMMARY OF THE INVENTION

It is an object of the present invention to provide a single-lens reflex camera which drives a mirror shutter driving system and a film feeding system by a single motor in a simple structure so that the size and cost of camera is minimumized.

It is another object of the present invention to provide a single-motor type of single-lens reflex camera which can perform multiple exposure in a simple structure.

It is still another object of the present invention to provide a single-motor type of single-lens reflex camera for self-feeding film cartridge which can rewrite the magnetic data in a simple structure.

To achieve the object mentioned above, according to the present invention, there is provided a motor-driven single-lens reflex camera, which controls and executes, through rotation of a single motor in a forward or a reverse direction, a mirror up operation, a mirror down operation and a shutter charge operation by a mirror/shutter driving system, and also a film winding operation and a film rewinding operation by a film feeding system, wherein the mirror up and the shutter charge release operations are executed through forward rotation of the motor, and the mirror down, the shutter charge and the film winding/rewinding operations are executed through reverse rotation of the motor. Thus the speedy film feeding after exposure can be made by switching from the mirror down and film charge operations to the film winding operation without stopping or reverse driving of the motor.

Further, the motor-driven single-lens reflex camera is provided with: a first clutch mechanism, including a latch lever movable between a clutch-engaged position and a clutch-disengagable position, which transmits the drive of the motor to the mirror/shutter driving system in a direction corresponding to rotation of the motor in the forward or reverse direction when the latch lever is at the clutch-engaged position, and which engages the motor either with the mirror/shutter driving system or with the film driving system via switching thereto according to the rotation of the motor in the forward or reverse direction when the latch lever is at the clutch-disengagable position; a second clutch mechanism, including a force lever movable between a winding position and a rewinding position, which engages the motor with a winding system when the force lever is at the winding position, and which switches the motor so as to be engaged with a rewinding system, in a state that the first clutch mechanism engages the motor with the film feeding system; a rotating cam, (a single-rotation cam) which is rotated when the first clutch mechanism engages the rotation of the motor with the mirror/shutter driving system, which maintains a mirror down position and a shutter charge state at a charge position, and which lifts a mirror and releases the shutter charge state at an exposure angular position which is different from the charge position; a force lever cam, provided in the rotating cam, which forcibly moves the force lever from the winding position to the rewinding position, when the rotating cam is at a rewinding angular position which is assigned at an angular position opposite to the exposure angular position with respect to the position of the charge position; and a latch lever moving means, which moves the latch lever to the clutch-engaged position when the rotating cam is at the exposure angular position, and which also moves the latch lever to the clutch-disengagable position when the rotating cam is either at the charge position or at the rewinding angular position.

Accordingly, in a release operation, an exposure is executed by driving the motor in the forward direction so that the rotating cam is rotated in the forward direction to be moved from the charge position to the exposure angular position, then the mirror down operation and the shutter charge operation are executed by driving the motor in the reverse direction so that the rotating cam is rotated in the reverse direction to be moved from the exposure angular position to the charge position, and the film winding operation is executed by driving the motor in the reverse direction.

Preferably, the latch lever moving means includes a spring member to apply force to the latch lever in order to set the latch lever at the clutch-engaged position; and a latch lever cam, provided in the rotating cam, which forcibly moves the latch lever from the clutch-engaged position to the clutch-disengagable position, when the rotating cam is either at the charge position or at the rewinding angular position. With this structure, since the movement of the latch lever depends on the position of the rotating cam, it is impossible, for example, to rotate in reverse from the charge position toward the rewinding angular position. Therefore, the camera according to the present invention may include an electromagnet to hold a shutter, wherein in a film rewinding operation, the electromagnet is initially actuated so as to prevent movement of the shutter, subsequently the motor is driven in the forward direction to rotate the rotating cam in the forward direction to be moved from the charge position to the rewinding angular position. During this operation, since the rotating cam passes through the exposure angular position, the operations relating to the mirror/shutter system may be executed, but the electromagnet to hold the shutter prohibits the motion of the shutter, hence an unexpected exposure of the film can be prevented.

In order to exclude the above operations relating to the mirror/shutter system, the latch lever moving means can include an electromagnet device which moves the latch lever between the clutch-engaged position and the clutch-disengagable position without relying on rotation of the rotating cam. In the film rewinding operation, the latch lever may initially be moved to the clutch-engaged position when the rotating cam is at the charge position, subsequently the motor is driven in the reverse direction to move the rotating cam in the reverse direction from the charge position to the rewinding angular position.

Preferably, the first and second clutch mechanism may be composed of planetary gear drives.

Further, according to the present invention, there is provided a motor-driven single-lens reflex camera for a self-feeding film cartridge, which controls and executes, through forward and reverse rotation of a single motor, a mirror up/down operation and a shutter charge operation by a mirror/shutter driving system, and also a film winding/rewinding operation by a film feeding system, wherein the mirror up and the shutter charge release operations are executed through forward rotation of the motor, and the mirror down, the shutter charge and the film winding/rewinding operations are executed through reverse rotation of the motor, by using the self-feeding film cartridge, including: a first clutch mechanism, including a latch lever movable between a clutch-engaged position and a clutch-disengagable position, which transmits driving of the motor to the mirror/shutter driving system in a direction corresponding to rotation of the motor in the forward or reverse direction when the latch lever is at the clutch-engaged position, and which engages the motor either with the mirror/shutter driving system or with the film driving system via switching thereto according to the rotation of the motor in the forward or reverse direction when the latch lever is at the clutch-disengagable position; a second clutch mechanism, including a force lever movable between a winding position and a rewinding position, which engages the motor with a winding system when the force lever is at the winding position, and which switches the motor so as to be engaged with a rewinding system, in a state that the first clutch mechanism engages the motor with the film feeding system; a rotating cam, which is rotated when the first clutch mechanism engages the rotation of the motor with the mirror/shutter driving system, which maintains a mirror down position and a shutter charge state at a charge position, and which lifts a mirror and releases the shutter charge state at an exposure angular position which is different from the charge position; a force lever cam, provided in the rotating cam, which forcibly moves the force lever from the winding position to the rewinding position, when the rotating cam is at a rewinding angular position which is assigned at an angular position opposite to the exposure angular position with respect to the position of the charge position; and a latch lever moving means, which moves the latch lever to the clutch-engaged position when the rotating cam is at the exposure angular position, and which also moves the latch lever to the clutch-disengagable position when the rotating cam is either at the charge position or at the rewinding angular position.

Accordingly, in a release operation, an exposure is executed by driving the motor in the forward direction so that the rotating cam is rotated in the forward direction to be moved from the charge position to the exposure angular position, then the mirror down operation and the shutter charge operation are executed by driving the motor in the reverse direction so that the rotating cam is rotated in the reverse direction to be moved from the exposure angular position to the charge position, and the film winding operation is executed by driving the motor in the reverse direction. Further, in a first film-frame setting operation, the motor is initially driven in the forward direction to rotate the rotating cam from the rewinding angular position to the charge position, and subsequently, the motor is driven in the reverse direction.

The motor-driven single-lens reflex camera for a self-feeding film cartridge according to the present invention may be provided with a magnetic head to carry out the magnetic recording on the magnetic layer of film, so that rewriting of the magnetic record (the rewind write operation) can be executed. For example, the camera may be provided with a spring member to apply force to the latch lever in order to set the latch lever at the clutch-engaged position; and a latch lever cam, provided in the rotating cam, which forcibly moves the latch lever from the clutch-engaged position to the clutch-disengagable position, when the rotating cam is either at the charge position or at the rewinding angular position. Hence in a magnetic record rewrite operation, the motor is initially driven in the forward direction to rotate the single-rotation cam in the forward direction to be moved from the charge position to the rewinding angular position, then the film rewinding operation is executed by driving the motor in the reverse direction, and after execution of the film rewinding operation, the motor is driven in the forward direction to rotate the rotating cam from the rewind position to the charge position, then the film winding operation is executed by driving the motor in the reverse direction. The rewind write operation is executed in this film winding operation.

Preferably, the latch lever moving means may be an electromagnet device to move the latch lever between the clutch-engaged position and the clutch-disengagable position without relying on rotation of the rotating cam. With this structure, in a magnetic record rewrite operation, the latch lever is initially moved to the clutch-engaged position, then the motor is driven in the reverse direction to rotate the rotating cam in the forward direction to be moved from the charge position to the rewinding angular position, then the latch lever is switched to the clutch-disengagable position when the rotating cam is at the rewinding angular position, and the film rewinding operation is executed by driving the motor in the reverse direction, and after execution of the film rewinding operation, the motor is driven in the forward direction to rotate the rotating cam from the rewinding angular position to the charge position, then the film winding operation is executed by driving the motor in the reverse direction. Therefore, since the rotating cam will not pass through the exposure angular position in the rewind write operation, the operations relating to mirror/shutter system will not be executed.

Further, a motor-driven single-lens reflex camera according to the present invention is provided with: a first clutch mechanism, including a latch lever movable between a clutch-engaged position and a clutch-disengagable position, which transmits driving of the motor to the mirror/shutter driving system in a direction corresponding to rotation of the motor in the forward or reverse direction when the latch lever is at the clutch-engaged position, and which engages the motor either with the mirror/shutter driving system or with the film driving system via switching thereto according to the rotation of the motor in the forward or reverse direction when the latch lever is at the clutch-disengagable position; a second clutch mechanism, including a force lever movable between a winding position and a rewinding position, which engages the motor with a winding system when the force lever is at the winding position, and which switches the motor so as to be engaged with a rewinding system, in a state that the first clutch mechanism engages the motor with the film feeding system; a rotating cam, which is rotated when the first clutch mechanism engages the rotation of the motor with the mirror/shutter driving system, which maintains a mirror down position and a shutter charge position at a charge position, and which lifts a mirror and releases the shutter charge state at an exposure angular position which is different from the charge position; a force lever cam, provided in the rotating cam, which forcibly moves the force lever from the winding position to the rewinding position, when the rotating cam is at a rewinding angular position which is assigned at an angular position opposite to the exposure angular position with respect to the position of the charge position; and a latch lever moving means, which moves the latch lever to the clutch-engaged position when the rotating cam is at the exposure angular position, and which also moves the latch lever to the clutch-disengagable position when the rotating cam is either at the charge position or at the rewinding angular position.

Accordingly, in a release operation, an exposure is executed by driving the motor in the forward direction so that the rotating cam is rotated in the forward direction to be moved from the charge position to the exposure angular position, then the mirror down operation and the shutter charge operation are executed by driving the motor in the reverse direction so that the rotating cam is rotated in the reverse direction to be moved from the exposure angular position to the charge position, and the film winding operation is executed by driving the motor in the reverse direction. Further, in a multiple exposure operation, after at least one exposure, the motor is initially driven in the reverse direction to execute the mirror down operation and the shutter charge operation, and subsequently, the motor is stopped.

Preferably, the following arrangement may be provided, namely, during rotation of the rotating cam in the reverse direction to be moved from the exposure angular position, the mirror down operation and the shutter charge operation have been completed before the latch lever is moved to the clutch-disengagable position, and in the multiple exposure operation, the motor has been stopped before the latch lever is started to move to the clutch-disengagable position. With this structure, it is possible to accomplish the speed up of the multiple exposure operation.

The present disclosure relates to subject matter contained in Japanese Patent Applications Nos. 9-148319 (filed on Jun. 5, 1997) and 9-148320 (filed on Jun. 5, 1997) which are expressly incorporated herein by reference in their entireties.

BRIEF DESCRIPTION OF THE DRAWINGS

The invention will be described below in detail with reference to the accompanying drawings, in which:

FIG. 33 is a timing chart showing a relation between a rotation of the single-rotation cam gear by actuating the latch lever by the electromagnet and control states of each mechanism.

DESCRIPTION OF THE PREFERRED EMBODIMENTS

The present invention will now be described with reference to drawings attached hereto. It should be noted that the present invention essentially relates to a camera applied to the Advanced Photo System.

Figure 26:
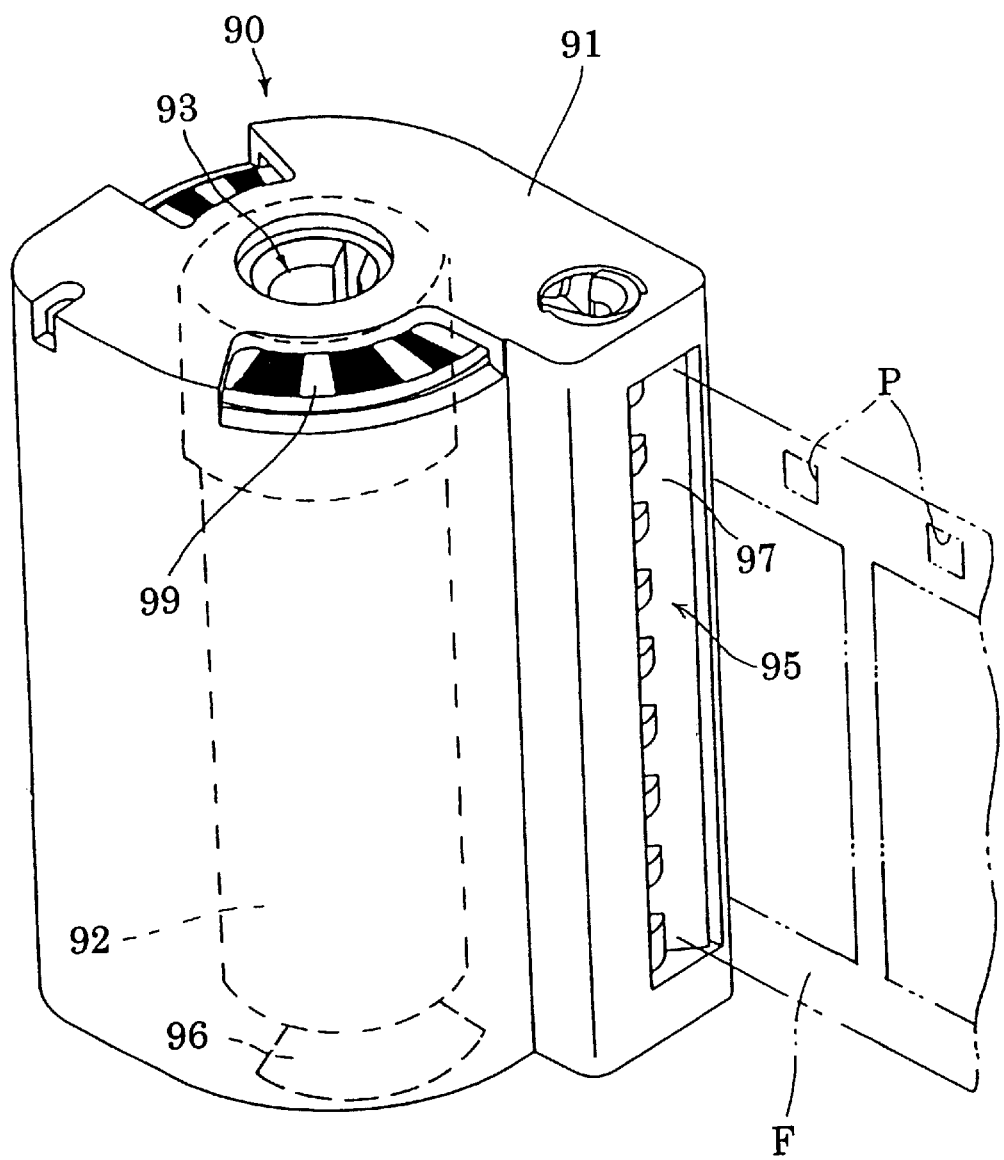
FIG. 26 is a schematic view of a self-feeding film cartridge as viewed from one side.

A self-feeding type of film cartridge will be explained below in detail with reference to FIGS. 26 and 27. As illustrated in FIG. 26, a film cartridge 90 has a cylindrical shaped housing 91 inside which the a cartridge spool 92 is rotatively provided. The film F is wound around the cartridge spool 92. The film F is provided with two perforations P per photographing frame. There is a shaft receiving hole 93 in a substantial cylindrical shape formed on one end of the cartridge spool 92 facing one end (top or bottom) of the housing 91. Provided on an extended portion of the housing 91 is a film feed opening 95. The film feed opening 95 is provided with a light-shielding door 97 which opens or closes the film feed opening 95. The light-shielding door 97 is rotatively supported via a pivot inside the housing 91 to open and close the film feed opening 95 by rotation. The housing 91 has an cutaway opening on one end thereof from which a data disk 99 is partially exposed. The data disk 99 rotates together with the above mentioned cartridge spool 92, and has bar-code indications on the surface thereof to indicate photographing frame numbers and the film speed of the film F.

Figure 27:
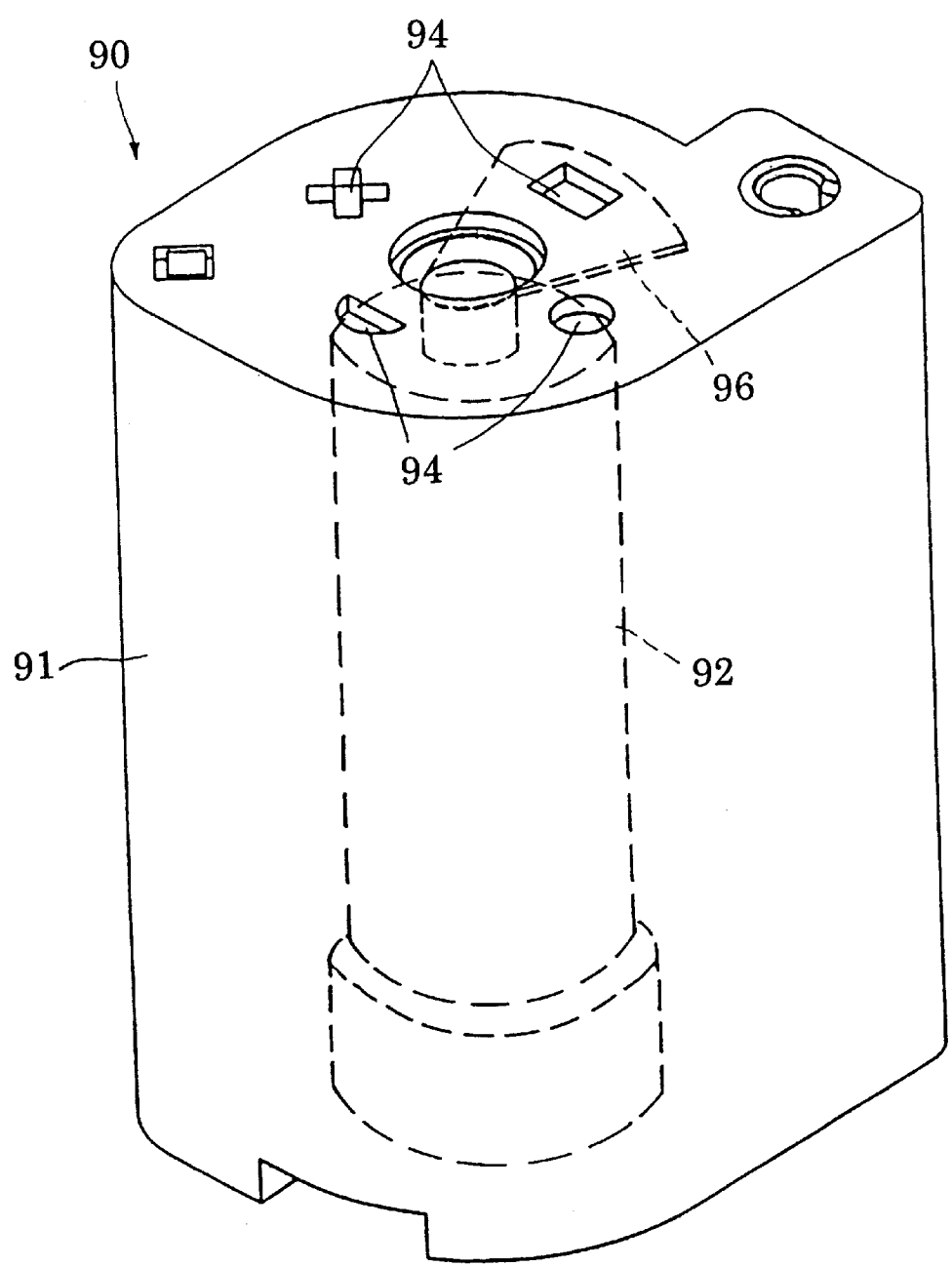
FIG. 27 is a schematic view of the self-feeding film cartridge as viewed from the other side of FIG. 26.

As shown in FIG. 27, there are four exposure state indication holes 94 on the other end surface of the housing 91. Each hole has a different shape in order to indicate the corresponding state, namely, unexposed, partially exposed (halfway rewound before all the photographic frames are exposed), exposed (exposed until the last frame), and developed. The cartridge spool 92 includes an indicating plate 96 on the end opposite to the shaft receiving hole 93. The indicating plate 96 is faced to any of the four exposure state indication holes 94 by controlling the stop position of rotation of the cartridge spool 92, so that the exposure state of the film cartridge 90 may visibly be confirmed.

Figure 1:
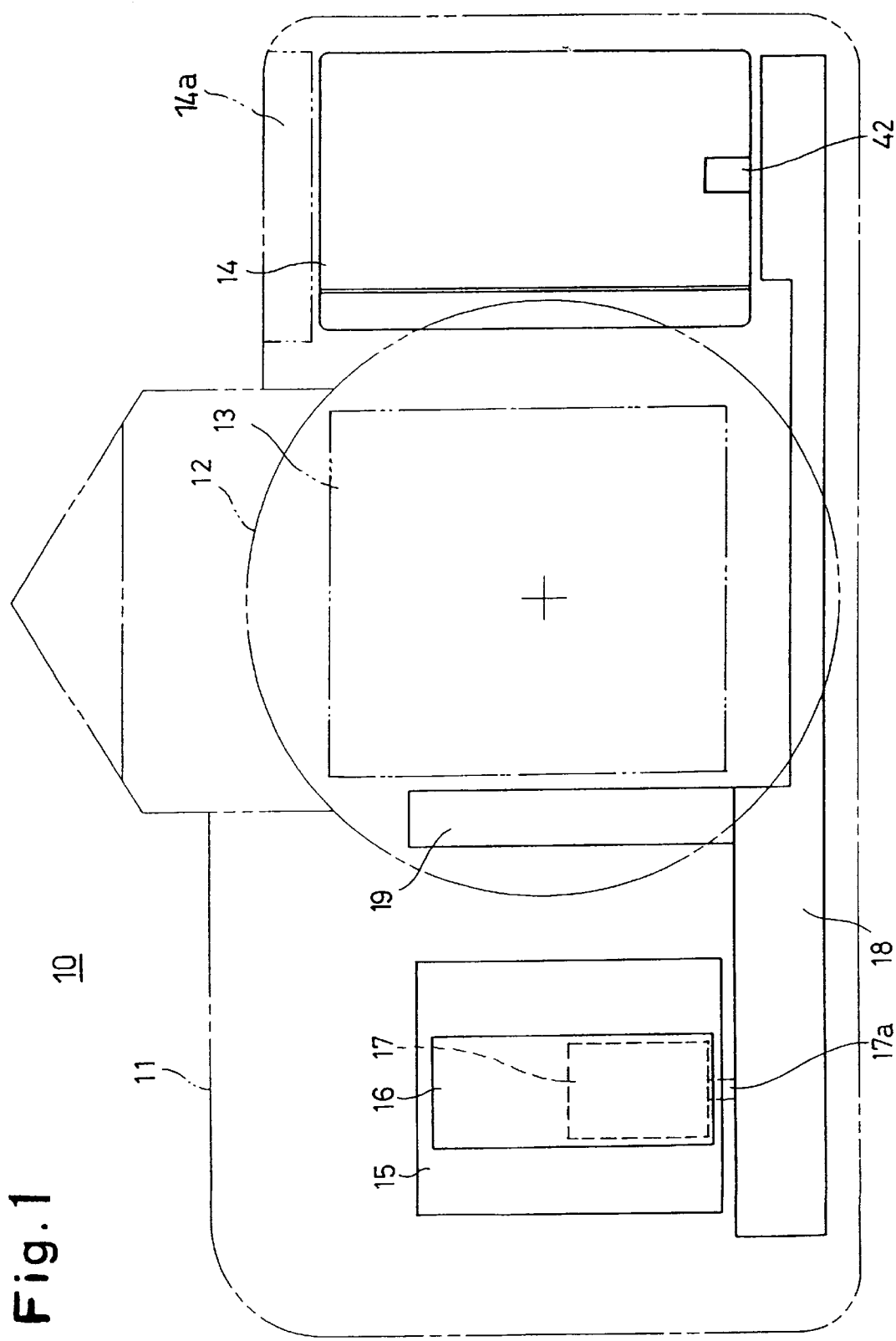
FIG. 1 is an elevational view showing an internal structure of a motor-driven single-lens reflex camera according to an embodiment of the present invention.

FIG. 1 is a front elevational view of a structure inside a single-lens reflex camera 10 using the film cartridge 90. Provided in the substantially central portion of the camera body 11, which has a sideways elongated shape, is a detachable photographic lens 12. The camera body 11 has a photographic optical path 13 in the rear of photographic lens 12, and a cylindrical shaped film cartridge storage chamber 14 (on the right in FIG. 1) and also a cylindrical shaped winding spool chamber 15 (on the left in FIG. 1). A cartridge spool driving shaft 42 is protrusively provided on one end of the film cartridge storage chamber 14. The cartridge spool driving shaft 42 is engaged with the shaft receiving hole 93 when the film cartridge 90 is loaded inside the film cartridge storage chamber 14, so that the driving force may be transmitted to the cartridge spool 92 without making relative rotation. The camera body 11 has a cartridge insertion hole (not shown) to connect the film cartridge storage chamber 14 to the outside of the camera body 11, at which an opening cover 14a with a locking mechanism is provided.

The winding spool chamber 15 is provided with a cylindrical shaped winding spool 16 inside thereof, and a motor 17 which serves as an overall driving source for the camera 10 is provided inside the vacant space of axial part of the winding spool 16. The motor 17 has protruding therefrom an output shaft 17a toward the underside of the camera body 11, so that the driving force of the motor 17 is transmitted from this output shaft 17a to a film feeding mechanism 18 or a mirror/shutter driving mechanism 19. The film feeding mechanism 18 includes, a gear train from the output shaft 17a of the motor 17 connected to the winding spool 16, and another gear train from the output shaft 17a connected to the cartridge spool driving shaft 42 via the bottom of the photographic optical path 13. The mirror/shutter driving mechanism 19 is provided along the vertical side of the photographic optical path 13.

Figure 2:
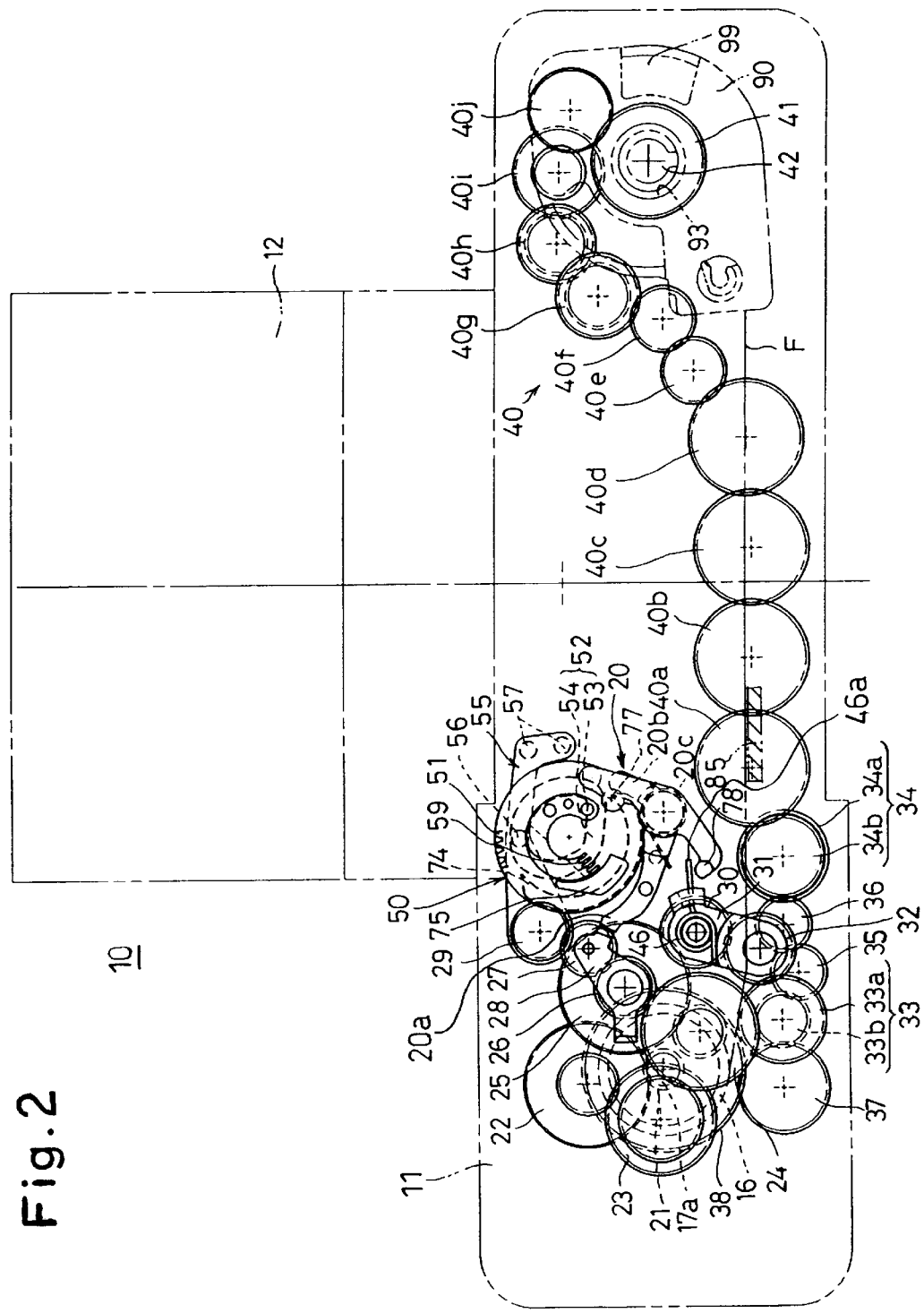
FIG. 2 is an underside plan view of a drive mechanism of the camera of FIG. 1.

FIG. 2 illustrates an overall structure of the film feeding mechanism 18 and a partial structure of the mirror/shutter driving mechanism 19, as viewed from the underside of the camera 10. There is a pinion 21 provided at an end of the output shaft 17a of the motor 17, with which a large gear of a two-stage type of transmission gear 22 is engaged. The transmission gear 22, and other transmission gears 23 and 24 are double (two-stage) transmission gears, and the small gear of each double gear is engaged with the large gear of the next double gear in order to reduce the speed of rotation of the output shaft 17a. The small gear of the transmission gear 24 is engaged with the large gear 25, which pivotally supports a coaxial first sun gear 26, so that the large gear 25 and the first sun gear 26 rotate as a whole. The pivot of the first sun gear 26 further rotatably supports a base end of a revolution support-arm 28. The revolution support-arm 28 pivotally supports a first planet gear 27 adjacent to the top thereof, and the first planet gear 27 is engaged with the first sun gear 26. Accordingly, when the first sun gear 26 (and the large gear 25) rotates, the first planet gear 27 supported by the revolution support-arm 28 revolves along the periphery of the first sun gear 26 in the same direction as that of the rotation of the first sun gear 26, and when the revolution of the first planet gear 27 is restrained, the first planet gear 27 rotates at the restrained position in the direction opposite to the rotative direction of the first sun gear 26.

The first planet gear 27 engages, either with a cam driving gear 29 pivotally supported in the camera body 11, or with a second sun gear 30 pivotally supported in the camera body 11, according to the position of revolution. The revolution of the first planet gear 27 is prevented upon engagement with any gear, so that the rotation of the motor 17 is transmitted to the cam driving gear 29 or the second sun gear 30. Specifically, when the output shaft 17a (pinion 21) of the motor 17 rotates in the counterclockwise direction of FIG. 2, the first sun gear 26 rotates in the counterclockwise direction, and the first planet gear 27 revolves in the direction to be engaged with the cam driving gear 29. Similarly, when the output shaft 17a (pinion 21) of the motor 17 rotates in the clockwise direction of FIG. 2, the first sun gear 26 rotates in the clockwise direction, and the first planet gear 27 revolves in the direction to be engaged with the second sun gear 30. The cam driving gear 29 is a component of the mirror/shutter driving mechanism 19, and the second sun gear 30 serves as a first driving component of the film feeding mechanism 18. Therefore, when the first planet gear 27 revolves, either the film feeding mechanism 18 or the mirror/shutter driving mechanism 19 is interlocked with the motor 17. Thus a planetary gear mechanism, composing of the first sun gear 26, the first planet gear 27 and the revolution support-arm 28, serves as a first clutch mechanism to serve switching of the interlocked direction thereof either to the mirror/shutter system or to the film feeding system according to the rotative direction (clockwise or counterclockwise of FIG. 2) of the motor 17.

Figure 5:
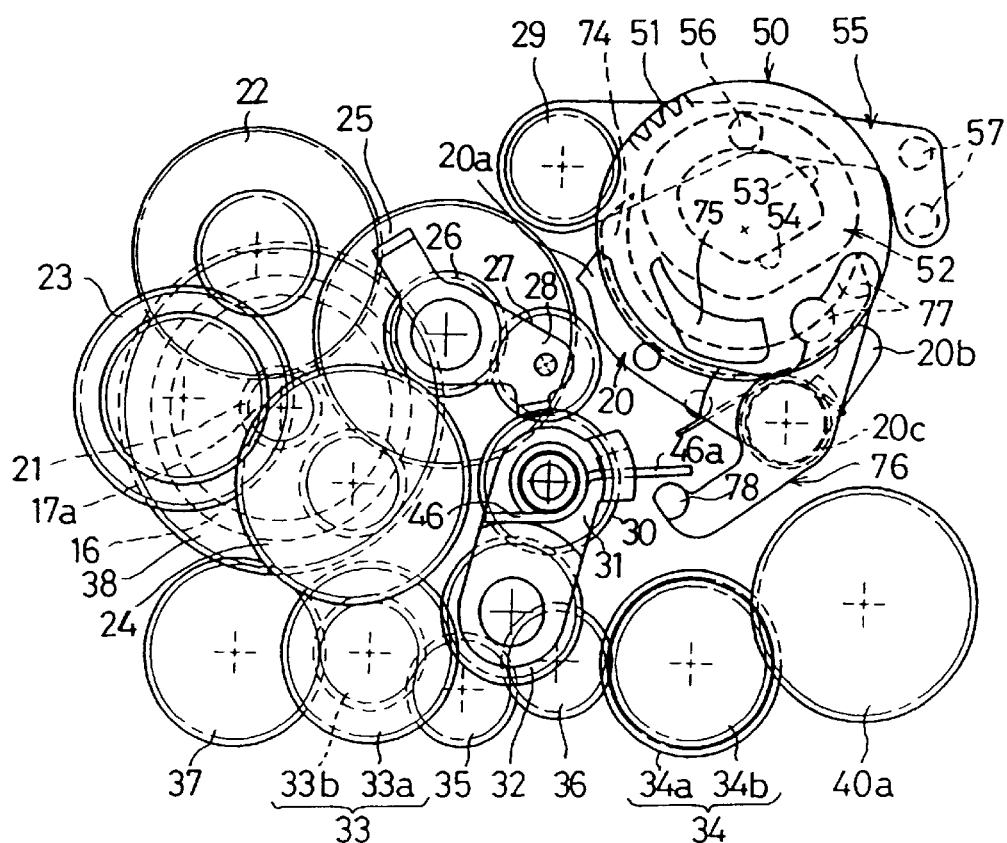
FIG. 5 is a bottom plan view of essential parts of film feeding mechanism when a single-rotation cam (rotating cam) gear is at an initial position and a clutch mechanism is in a film winding state.
Figure 6:
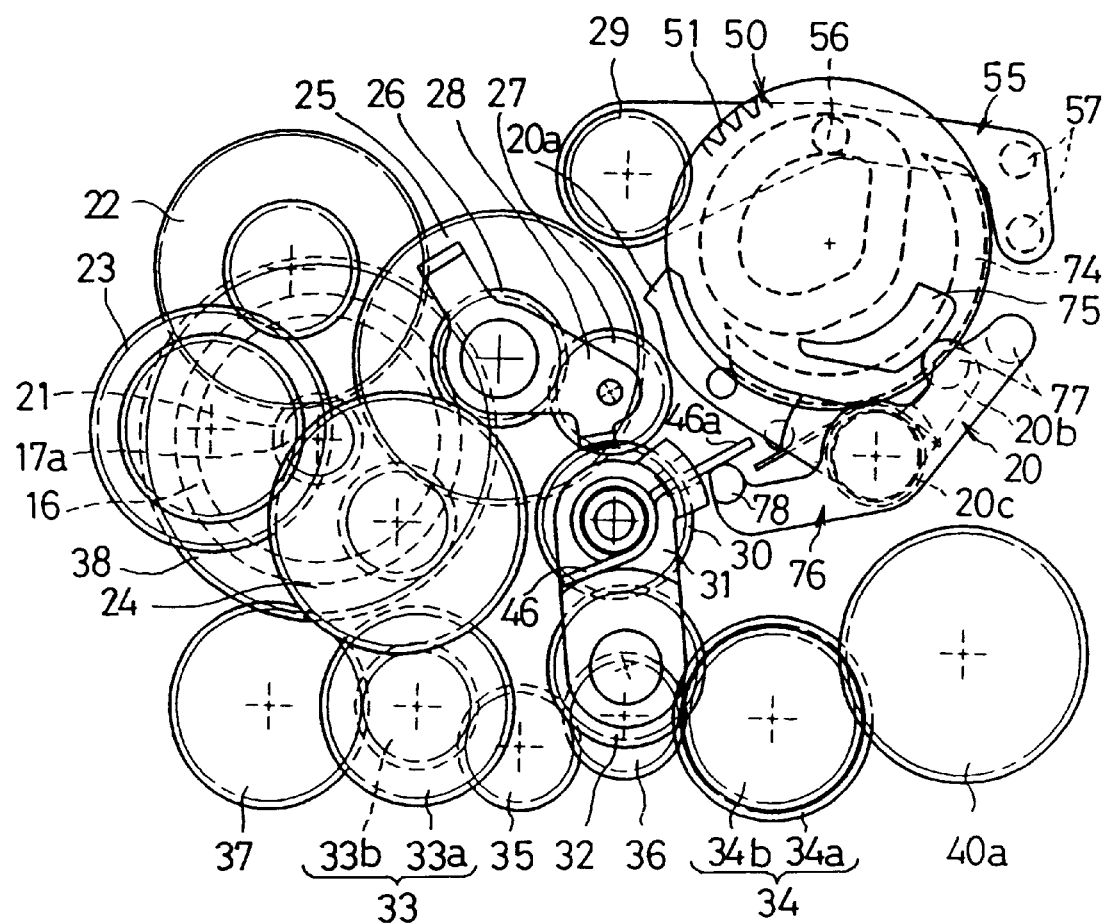
FIG. 6 is an underside plan view of essential parts of film feeding mechanism when the single-rotation cam gear is at a rewinding angular position and the clutch mechanism is in a film rewinding state.
Figure 7:
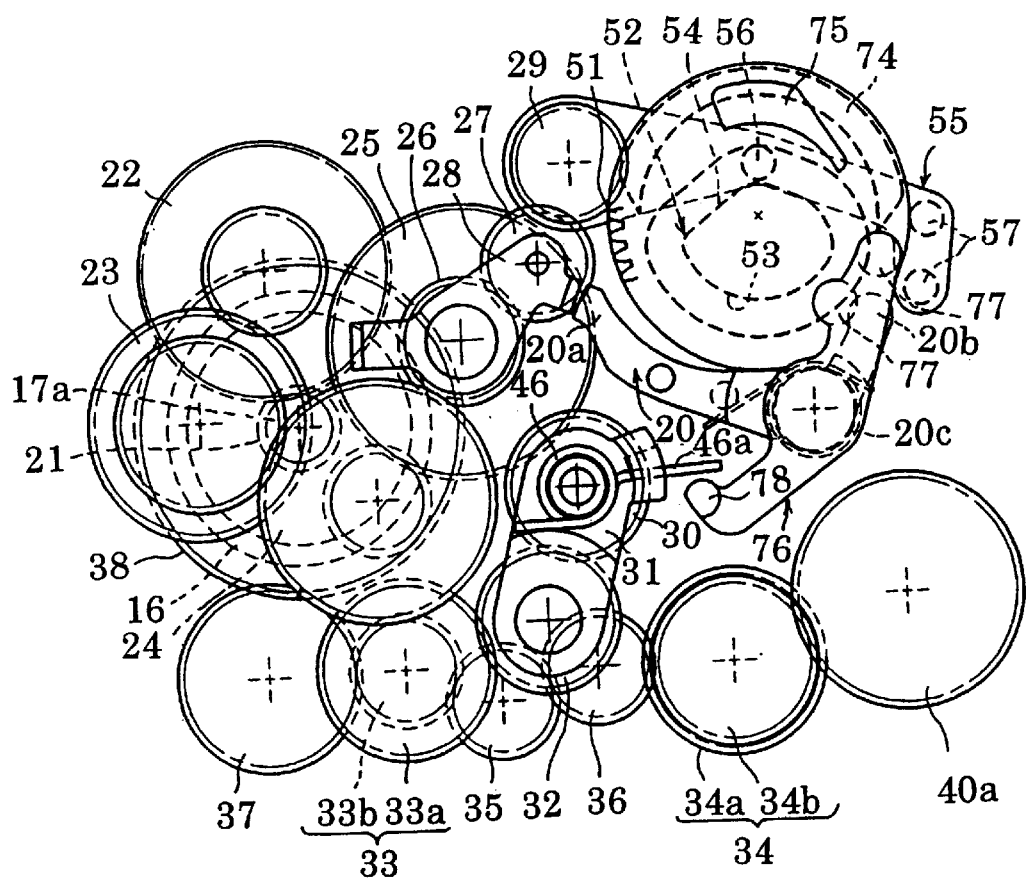
FIG. 7 is a bottom plan view of essential parts of film feeding mechanism when the single-rotation cam gear is at an exposure angular position and the clutch mechanism is connected to the mirror/shutter driving mechanism.
Figure 8:
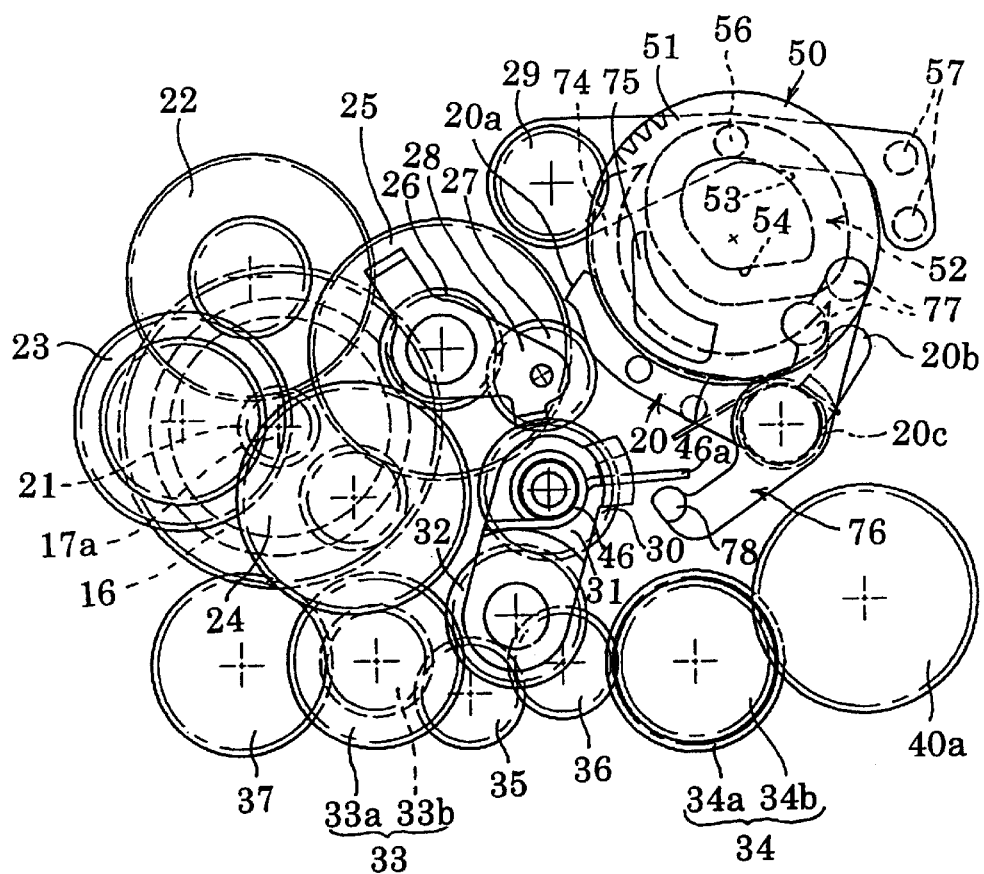
FIG. 8 is a bottom plan view of essential parts of film feeding mechanism when the single-rotation cam gear is at a winding angular position and the clutch mechanism is connected to the mirror/shutter driving mechanism.
Figure 9:
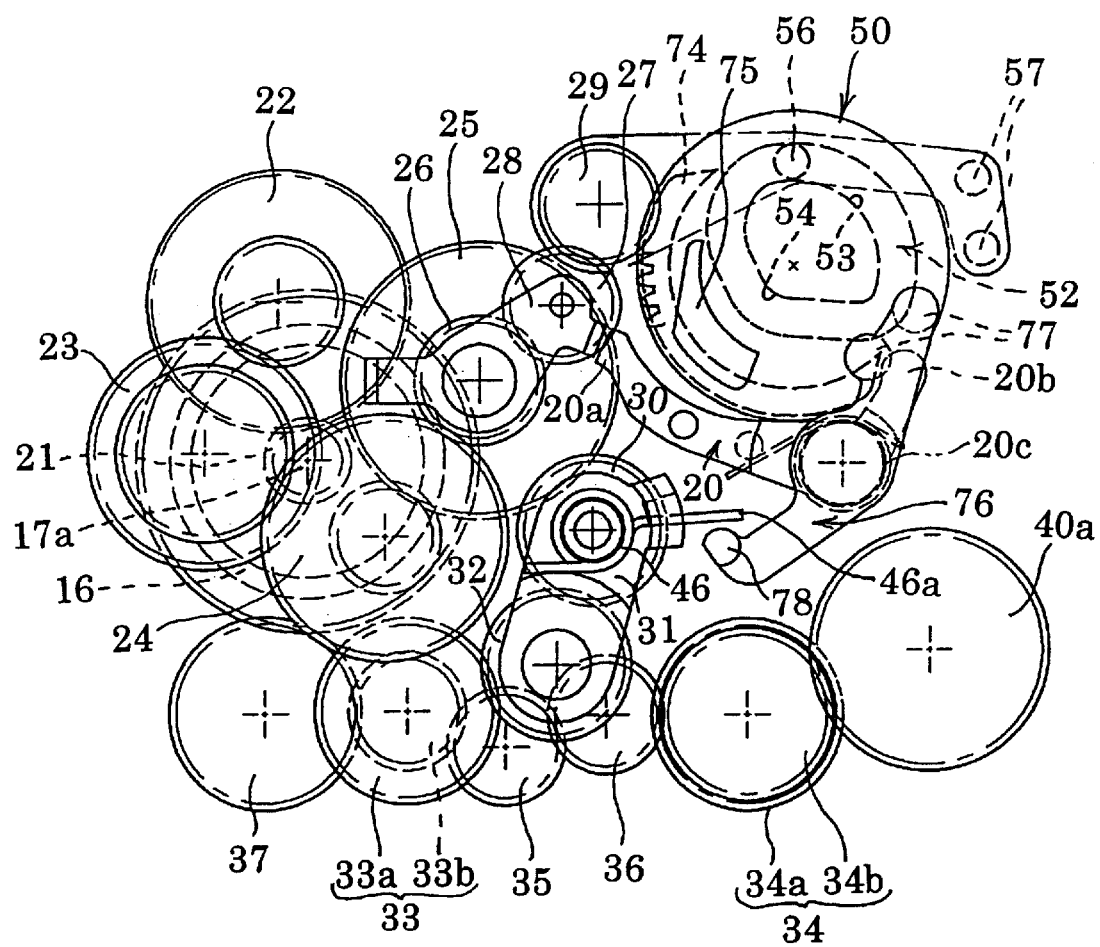
FIG. 9 is an underside plan view of essential parts of film feeding mechanism when the single-rotation cam gear is at a multiple exposure angular position and the clutch mechanism is in a film winding state.
Figure 10:
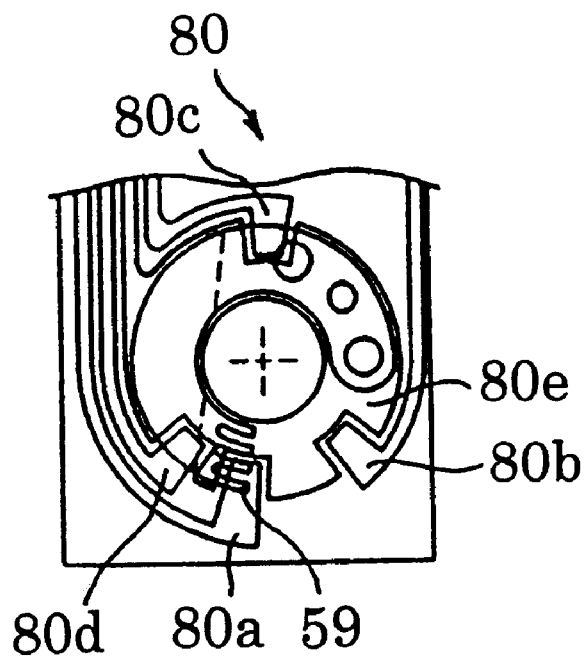
FIG. 10 is a plan view of a state of contact of a detection brush with a switch circuit board as viewed from the underside thereof when the single-rotation cam gear is at initial position.
Figure 11:
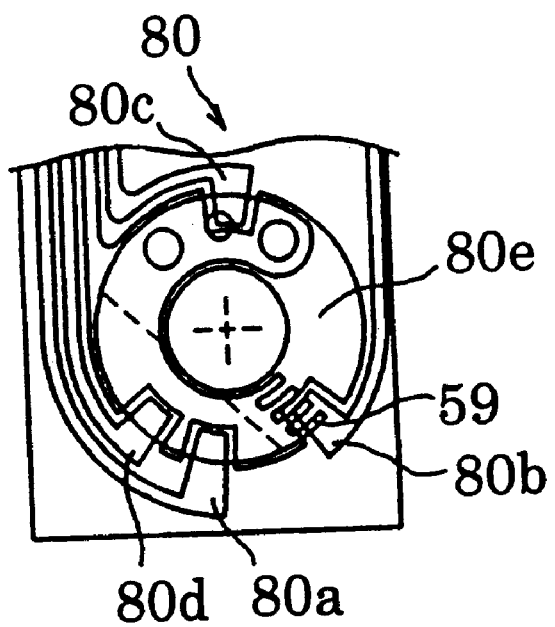
FIG. 11 is a plan view of a state of contact of the detection brush with the switch circuit board as viewed from the underside thereof when the single-rotation cam gear is at the rewinding angular position.
Figure 12:
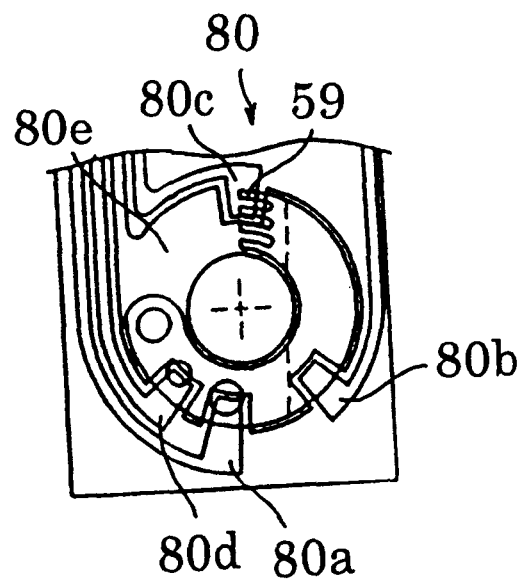
FIG. 12 is a plan view of a state of contact of the detection brush with the switch circuit board as viewed from the underside thereof when the single-rotation cam gear is at the exposure angular position.
Figure 13:
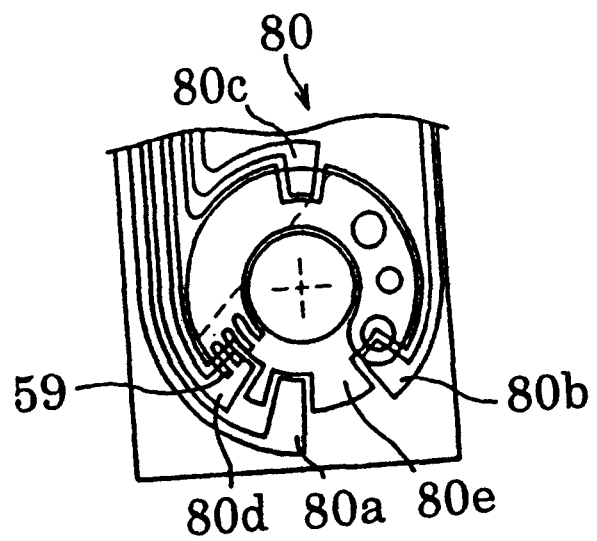
FIG. 13 is a plan view of a state of contact of the detection brush with the switch circuit board as viewed from the underside thereof when the single-rotation cam gear is the multiple exposure rotation-position.

The first clutch mechanism has a latch lever 20. The latch lever 20 has the shape of the letter L, provided with a stopper 20a at the long side thereof, and with a cam engagement arm 20b at the short side thereof. The bent portion of the latch lever 20 is pivotally supported by the camera body 11. The stopper 20a is elongated in the direction of the revolution support-arm 28, and when the latch lever 20 swings in a position so that the first planet gear 27 is engaged with the cam driving gear 29, the stopper 20a is engaged with or disengaged from the top of the revolution support-arm 28. In the case of engagement of the stopper 20a with the revolution support-arm 28, the revolution of the first planet gear 27 is restrained. Namely, the switching of the first clutch mechanism is prevented (FIGS. 7 and 9). This will be termed as a "latched position" (clutch-engaged position) of the latch lever 20. When the latch lever 20 rotates clockwise from the clutch-engaged position, the stopper 20a moves to release the latched state (FIGS. 5, 6 and 8). This will be termed as a "latch-released position" (clutch-disengagable position) of the latch lever 20. Accordingly, when the latch lever 20 is at the latch-released position, the first clutch mechanism selectively transmits the driving force either to the film feeding mechanism 18 or to the mirror/shutter driving mechanism 19 corresponding to the rotative direction of the motor 17. Further, when the latch lever 20 is at the latched position, the first clutch mechanism rotates the cam driving gear 29 in any direction according to the rotative direction of the motor 17; force is applied to the latch lever 20 by a torsion spring 20c towards the latched position.

In regard to the driving mechanisms driven and controlled by this first clutch mechanism (as shown in FIG. 2), the film feeding mechanism 18 will first be described. The second sun gear 30 is pivotally supported in the camera body 11, and the pivot of the second sun gear 30 further rotatably supports a base end of a revolution support-arm 31. The revolution support-arm 31 pivotally supports the second planet gear 32 at the top thereof, and the second planet gear 32 is engaged with the second sun gear 30. Therefore, the second planet gear 32 can revolve about the second sun gear 30 and is engaged either with a wind direction gear 33 (a large gear 33a) or with a rewind direction gear 34 (a small gear 34b). Both the wind direction gear 33 and the rewind direction gear 34 are rotatably supported in the camera body 11, and when the second planet gear 32 is engaged with either gear 33 or 34, the second planet gear 32 stops revolving, and transmits the driving force of the motor 17.

It is evident from the drawings and following description that the second sun gear 30 only rotates in the clockwise direction in this embodiment. That is, unless restrained to do otherwise, the second planet gear 32 would normally engage with the wind direction gear 33 when the second sun gear 30 rotates. However, the mechanism described hereinafter forcibly engages the planet gear 32 with the rewind direction gear 34. Under the forced engagement position, when the second sun gear 30 rotates, the small gear 34b of the rewind direction gear 34 rotates in the clockwise direction."

The wind direction gear 33 and the rewind direction gear 34 are both the double gears, in which, a small gear 33b of the wind direction gear 33 is engaged with an idle gear 35, and a large gear 34a of the rewind gear 34 is engaged with an idle gear 36. The idle gears 35 and 36 are engaged with each other. Since there are two idle gears provided therebetween, the rotative directions of the wind direction gear 33 and the rewind direction gear 34 are opposite to each other. However, the rewind direction gear 34 has a one-way clutch mechanism, which only transmits the rotation of the large gear 34a in the counterclockwise direction (of FIG. 2) to the small gear 34b to be interlocked, and does not transmit the rotation of the small gear 34b to the large gear 34a. Therefore, when the second planet gear 32 is engaged with the rewind direction gear 34, the wind direction gear 33 will not be driven.

The small gear 33b of the wind direction gear 33 is engaged (as well as the idle gear 35) with an intermediate gear 37; the intermediate gear 37 is engaged with a winding spool driving gear 38. The winding spool driving gear 38 is formed with the periphery of the winding spool 16 to rotate the winding spool 16. Further, the small gear 34b of the rewind direction gear 34 is engaged with a transmission gear 40a. There are ten transmission gears, in order from the transmission gear 40a to a transmission gear 40j to be engaged with the adjacent gears to serve as a reduction gear train 40, in which the transmission gear 40j is engaged with a cartridge spool driving gear 41. The cartridge spool driving gear 41 is integrally and coaxially formed with the cartridge spool driving shaft 42 protruding inside the film cartridge storage chamber 14.

When the second planet gear 32 is engaged with the wind direction gear 33 (the large gear 33a), the large gear 34a of the rewind direction gear 34 is rotated in the counterclockwise direction of FIG. 2, thereby the one-way clutch is connected to rotate the winding spool 16 as well as the cartridge spool driving shaft 42 in the clockwise direction of FIG. 2. Through this rotation, the film F is fed from the film cartridge 90 toward the winding spool 16.

Conversely, when the second planet gear 32 is engaged with the rewind direction gear 34 (the small gear 34b), as above discussed, since the driving force is not transmitted from the small gear 34b to the large gear 34a, the rewinding of the film F is carried out only by the rotation of the cartridge spool driving shaft 42 in the counterclockwise direction of FIG. 2. According to this structure, a gear train exclusively used for film winding is defined in order from the wind direction gear 33 to the winding spool driving gear 38, and a gear train used for both directions of film feeding and film rewinding is defined in order from the rewind direction gear 34 to the cartridge spool driving gear 41. The gears as the components of these gear trains are all single or double spur gears, of which the rotative axes are substantially parallel.

The gear ratio is set so that the winding spool 16 may rotate faster than the cartridge spool driving shaft 42 during operation in the film wind direction. Accordingly, when the film F fed from the cartridge spool 92 is wound around the winding spool 16, the winding of film F is chiefly carried out by using the rotative power of the winding spool 16. So that an excessive force cannot be applied to film F upon winding by a difference of the peripheral velocity of each spool, the one-way clutch of the rewind direction gear 34 is formed as a slip clutch which slips when a force exceeding a predetermined amount is applied thereto during contact of the clutch.

As described above, the planetary gear mechanism composing of the second sun gear 30, the revolution support-arm 31 and the second planet gear 32 serves as a second clutch mechanism which switches the direction of the feeding of the film F in the film feeding mechanism 18. The second clutch mechanism is provided with a torsion spring 46 hooked on the revolution support-arm 31, and an end 46a of the torsion spring 46 is extends toward the center of the camera body 11.

The second clutch mechanism is provided with a force lever 76 pivotally supported inside the camera body 11. The pivot of the force lever 76 is at the center thereof, from which two arms extend. One end of the arm has a pair of engagement pins 77, and the other end thereof has an operation pin 78, and the operation pin 78 extends to the close vicinity of the end 46a of the torsion spring 46. The operation pin 78 is engaged with or disengaged from the end 46a due to swing of the force lever 76, and when the force lever 76 rotates in the direction of engagement of the operation pin 78, the rotation of the force lever 76 presses the torsion spring 46 (the end 46a). When the end 46a is pressed, the revolution support-arm 31 is rotated in the counterclockwise direction of FIG. 2, so that the second planet gear 32 revolves so as to engage with the rewind direction gear 34 (the small gear 34b). When the operation pin 78 is not engaged with the end 46a, the force lever 76 will not actuate the second clutch mechanism, thereby the second clutch mechanism is in a state so that the second planet gear 32 is engaged with the wind direction gear 33 via the rotation of the second sun gear 30 in the clockwise direction of FIG. 2. Thus the force lever 76 has, a "non-forcing position" which allows the second clutch mechanism to be engaged with the winding mechanism (winding position as shown in FIGS. 5, 7, 8 and 9), and a "forcing position" which forces to press against the end 46a so that the second clutch mechanism can be in contact with the rewinding mechanism (rewinding position: as shown in FIG. 6).

The structure of the mirror/shutter driving mechanism 19 will now be described. Inside the camera body 11, there is a single-rotation cam gear (a rotating cam) 50 which rotates about a pivot of which the axis is parallel to that of each gear of the film feeding mechanism 18. The single-rotation cam gear 50 has a peripheral gear 51 formed thereon, and the peripheral gear 51 is engaged with the cam driving gear 29. A cam groove 52 is formed on one side (upper side) of the single-rotation cam gear 50. The cam groove 52 has an arc shape of a concentric cam section 53 and an eccentric cam section 54.

There is a driving lever 55 of which one end is pivotally supported by the same axis of the cam driving gear 29. The driving lever 55 is elongated in the lateral direction of the camera body 11, having a follower pin 56 at the center thereof which is engaged with the cam groove 52. Further, the driving lever 55 is protrusively provided with a pair of holder pins 57 at the end thereof toward the top of the camera body 11. While the single-rotation cam gear 50 rotates by one cycle, the follower pin 56 is guided by the cam groove 52, thus the driving lever 55 reciprocates in a predetermined width supported by the pivot. Accordingly, the pair of the holder pins 57 move toward the front and rear of the camera body 11. Specifically, when the follower pin 56 is guided by the concentric cam section 53, the pair of the holder pins move toward the front of the camera body 11 (as shown in FIGS. 3, 5, 6, 8 and 9), and when the follower pin 56 is guided by the eccentric cam section 54, the rotation is given to the driving lever 55 to move the holder pins 57 toward the rear of the camera body 11 (as shown in FIGS. 4 and 7).

Figure 3:
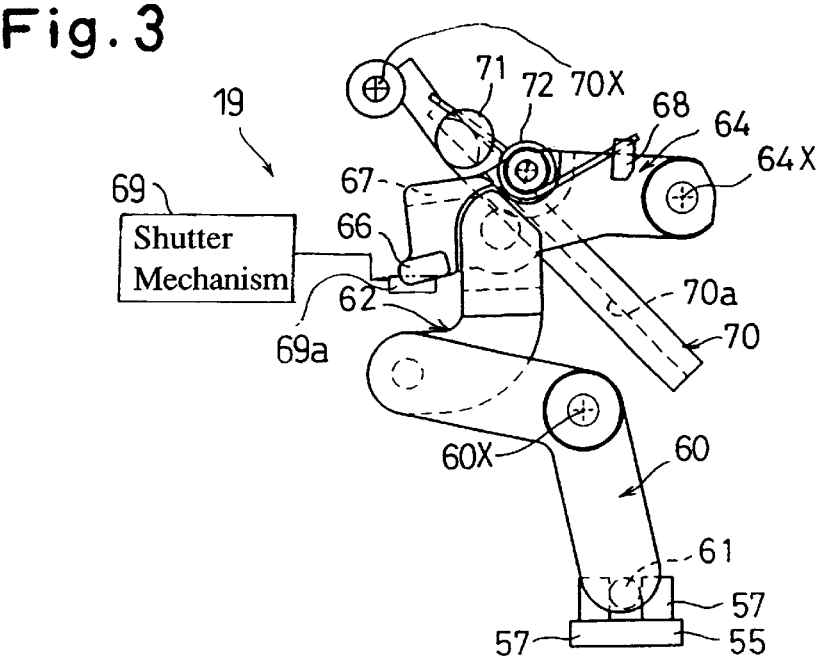
FIG. 3 is a side view of a mirror/shutter driving mechanism when a mirror is in a down position.
Figure 4:
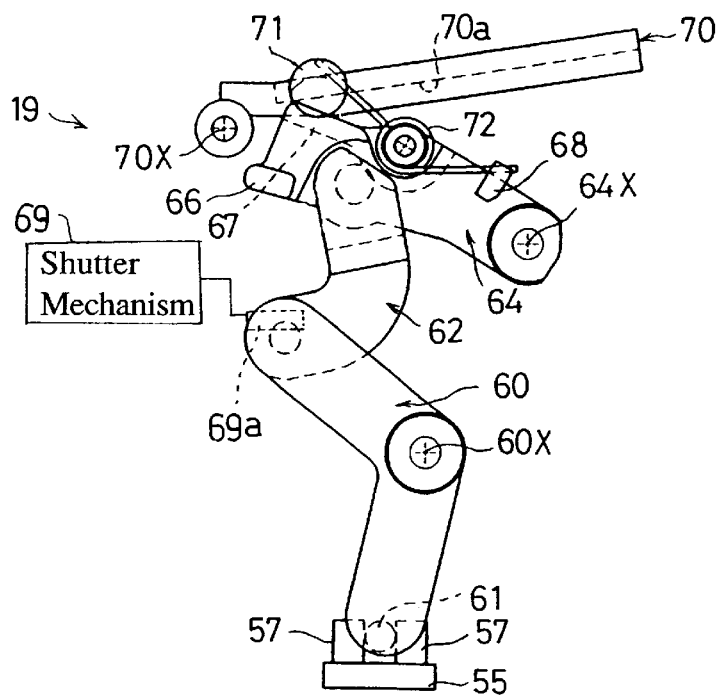
FIG. 4 is a side view of the mirror/shutter driving mechanism of FIG. 3 when a mirror is in an up position.

FIGS. 3 and 4 illustrate operation states of the mirror/shutter driving mechanism 19 as viewed from the side of the camera 10. Inside the camera body 11, there is a pivot 60x above the driving lever 55, of which the axis is perpendicular to the photographic optical axis. A first link 60 is pivotally supported at the center thereof by the pivot 60x. There is a follower pin 61 fixed at the bottom of the first link 60, inserted between and supported by the pair of holder pins 57. When the driving lever 55 reciprocates toward the front and rear of the camera body 11, the first link 60 swings according to the reciprocation of the driving lever 55. The top of the first link 60, namely the end opposite to the follower pin 61, is pivotally connected to the bottom of a second link 62 to allow relative movement to each other. The top of the second link 62 is then rotatably connected to a charge lever 64 which rotates by a pivot 64x at an end of the charge lever 64. A shutter charge protrusion 66 and a mirror operation portion 67 are formed at another end of the charge lever 64, namely the end opposite to the pivot 64x. With this structure, there is provided a four-link mechanism, in which when the second link 62 swings according to the swing of the first link 60, the charge lever 64 also rotates by the pivot 64x. The four-link mechanism as above discussed performs up/down movement of the shutter charge protrusion 66 as well as the mirror operation portion 67 upon receiving the reciprocation of the driving lever 55 toward the front and rear of the camera body 11.

The shutter charge protrusion 66 carries out the shutter charge operation in regard to an engagement member 69*a* of a shutter mechanism 69 when the charge lever 64 downwardly rotates from the position of FIG. 4 to that of FIG. 3 (the shutter charge position). The movement of the shutter mechanism 69 is mechanically restrained at the shutter charge position by the shutter charge protrusion 66. The shutter mechanism 69 of the single-lens reflex camera 10 according to the present embodiment is an electromagnetic controlled focal-plane shutter which is known per se, in which the movement of the shutter is electromagnetically restrained by actuating two shutter holding magnets 89 respectively provided for a first blind and a second blind (see FIG. 15). When the charge lever 64 moves to the up position of FIG. 4 in a state that the shutter holding magnets 89 are actuated, the mechanical prohibition of the shutter movement is released. Thereafter, when the electric power to the shutter holding magnets 89 is cut, the shutter operation (the movement of the first and second blinds) can be carried out.

The camera body 11 is further provided with a mirror 70 supported by a pivot 70*x* of which axis is perpendicular to the photographic optical axis. The mirror 70 rotates by the pivot 70*x* to move upwardly and downwardly, to locate itself in the photographic optical path 13 (an observational position), and to set itself away from the photographic optical path 13 (an photographic position). The mirror 70 is positioned at the photographic optical axis of the camera 10 at the observational position, so that an image incident on the photographic lens 12 can be observed by a viewfinder (not shown) via an observational optical system including the mirror 70. At the photographic position, however, since the mirror 70 is set aside from the position at the optical axis, the shutter may be operated to expose the film F. There is a torsion spring 72, ends of which are hooked by a protruding spring hook pin 71 provided on the side of a mirror sheet 70*a*, and by a spring hook protrusion 68 of the charge lever 64.

The mirror operation portion 67 of the charge lever 64 is positioned to allow engagement with and disengagement from the mirror sheet 70*a*, and when the charge lever 64 upwardly rotates from the position of FIG. 3 to that of FIG. 4, the mirror operation portion 67 lifts the mirror 70 to the photographic position. During this operation, the torsion spring 72 is flexed by a predetermined amount to apply a downward force on the mirror 70. When the charge lever 64 downwardly rotates from the position of FIG. 4 to that of FIG. 3, the upward pressure of the mirror operation portion 67 is released, accordingly the mirror 70 goes down to the observational position due to the force of the torsion spring 72.

As described above, the mirror/shutter driving system 19 drives the single-rotation cam gear 50 with the mirror up/down movement and the shutter charge operation. When the follower pin 56 of the driving lever 55 is guided by the concentric cam section 53, the mirror 70 is let down and the shutter is charged. When the follower pin 56 is guided by the eccentric cam section 54, the mirror 70 is pushed up and the shutter charge is released.

The single-rotation cam gear 50 is further provided with a latch lever cam 74 fixed on the same side of the cam groove 52, and with a force lever cam 75 on the other side thereof (on the side facing the underside of camera in FIG. 2). The latch lever cam 74 is positioned to be engaged with or disengaged from the cam engagement arm 20*b* of the latch lever 20 according to rotation of the single-rotation cam gear 50, so that the latch lever cam 74 presses the cam engagement arm 20*b* during engagement therewith. Thus the latch lever 20 is moved to the latch-released position against the torsion spring 20*c*. The shape of the latch lever cam 74 is that of an circular arc. Further, the force lever cam 75 is positioned to be engaged with or disengaged from engagement pins 77 of the force lever 76 according to rotation of the single-rotation cam gear 50, so that the engagement pins 77 press against the force lever cam 75 during engagement therewith. Thus the force lever 76 is moved to the forcing position. The force lever cam 75 is positioned on the opposite surface of the cam gear 50 from the latch lever cam 74. The shape of the force lever cam 75 is a combination of a concentric circular arc and a planar surface approaching the axis of the cam gear, and is shorter in the circumferential direction than the latch lever cam 74.

The single-rotation cam gear 50, which moves the mirror up/down and controls the shutter charge, also controls switching between the first and second clutch mechanisms at a predetermined angular position according to the above discussed cams 74 and 75. In particular, the rotative direction of the single-rotation cam gear 50 can be changed through control of the first clutch mechanism via the latch lever 20. For example, when the latch lever cam 74 is disengaged from the cam engagement arm 20*b* and the latch lever 20 is at the latched position, the first clutch mechanism is set at a state so as to engage the side of the mirror/shutter driving mechanism 19. In such a state, when the motor 17 is driven so that the output shaft 17*a* may be rotated in the counterclockwise direction of FIG. 2 (hereinafter referred to as "forward driving"/"drive forward"), the single-rotation cam gear 50 is rotated in the clockwise direction (hereinafter referred to as "forward rotation"/"rotate forward"), and when the motor 17 is driven so that the output shaft 17*a* may be rotated in the clockwise direction (hereinafter a "reverse driving" of the motor 17), he single-rotation cam gear 50 is rotated in the counterclockwise direction (hereinafter a "reverse rotation"). However, when the latch lever cam 74 is engaged with the cam engagement arm 20*b* and the latch lever 20 is moved to the latch-released position, although the single-rotation cam gear 50 also makes the forward rotation during the forward driving of the motor 17, the single-rotation cam gear 50 will not make the reverse rotation during the reverse driving of the motor 17 because of revolution of the first planet gear 27 toward the second sun gear 30. That is, as illustrated by bold arrows in FIG. 14, the forward driving of the motor 17 may make the forward rotation of the single-rotation cam gear 50 regardless of the position of the latch lever 20, but the reverse driving of the motor 17 can make the reverse rotation of the single-rotation cam gear 50 only when the latch lever 20 is at the latched position.

The single-rotation cam gear 50 is provided with a detection brush 59 that rotates as a whole. The camera body 11 is provided with a switch circuit board 80 composing of switch terminals 80*a*, 80*b*, 80*c* and 80*d*, and a land terminal 80*e* (see FIGS. 10 through 13). A terminal on the inner periphery of the detection brush 59 is always in contact with the land terminal 80*e*, and when a terminal on the outer periphery of the detection brush 59 is in contact with any of the switch terminals 80*a* through 80*d*, the electrical signal is supplied to a control circuit 100 of the camera 10 so that the angular positions of the single-rotation cam gear 50 can be detected. Thus the switch circuit board 80 and the detection brush 59 serve as a switch mechanism to detect the angular position of the single-rotation cam gear 50. The change of angular positions of the single-rotation cam gear 50 detected by this switch mechanism, as well as states of control of the mirror/shutter driving mechanism 19 and the two clutch mechanisms connected therewith, will be described below with reference to FIGS. 2 through 14.

When the detection brush 59 is in contact with the switch terminal 80a, (FIG. 10) the single-rotation cam gear 50 is at an angular position of that illustrated in FIG. 5. In this position, the follower pin 56 of the driving lever 55 is engaged with the concentric cam section 53, and the mirror/shutter driving mechanism 19 is in the position of FIG. 3, namely the mirror is down (the observational position) and the shutter is charged. Further, the latch lever cam 74 of the single-rotation cam gear 50 is engaged with the cam engagement arm 20b, thus the latch lever 20 is maintained at the latch-released position against the torsion spring 20c. As the force lever cam 75 is not engaged with the engagement pins 77, the force lever 76 is at the non-forcing position, so that the second clutch mechanism can be engaged with the winding side by rotation of the second sun gear 30 in the clockwise direction. In such a state, when the motor 17 drives forward, the first clutch mechanism is connected to the side of the mirror/shutter driving mechanism 19, thereby single-rotation cam gear 50 rotates forward. When the motor 17 drives in reverse, the first clutch mechanism then connects to the side of the film feeding mechanism 18, and the second clutch mechanism is connected to the winding side, thereby the film F can be wound. In other words, the reverse driving of the motor 17 will not make a reverse rotation of the single-rotation cam gear 50. This angular position will be referred to as "initial position" of the single-rotation cam gear 50, and the contact state at the initial position between the detection brush 59 and the switch terminal 80a will be referred to as an ON state of an "initial position switch".

When the detection brush 59 is in contact with the switch terminal 80b (FIG. 11), the single-rotation cam gear 50 is at an angular position as illustrated in FIG. 6. In the state of FIG. 6, the follower pin 56 of the driving lever 55 is engaged with the concentric cam section 53, and the mirror/shutter driving mechanism 19 is in the state of FIG. 3, namely the mirror is down (the observational position) and the shutter is charged. Further, the latch lever cam 74 is engaged with the cam engagement arm 20b, thus the latch lever 20 is maintained at the latch-released position. As the force lever cam 75 is engaged with the engagement pins 77, the force lever 76 is moved to the forcing position, so that the second clutch mechanism may be connected to the rewinding side (the rewind direction gear 34). In such a state, when the motor 17 drives forward, the single-rotation cam gear 50 makes forward rotation as in the case of the initial position as mentioned above. However, when the motor 17 drives in reverse, the first clutch mechanism is connected to the side of the film feeding mechanism 18, thereby the film F can be rewound. This angular position will be referred to as a "rewinding angular position" of the single-rotation cam gear 50, and the contact state at the rewinding angular position between the detection brush 59 and the switch terminal 80b will be referred to as an ON state of a "rewinding angular position switch".

When the detection brush 59 is in contact with the switch terminal 80c (FIG. 12), the single-rotation cam gear 50 is at an angular position as illustrated in FIG. 7. In the state of FIG. 7, the follower pin 56 of the driving lever 55 is guided by the eccentric cam section 54, and the mirror/shutter driving mechanism 19 is in the state of FIG. 4, namely, the mirror is up (the photographic position) and the shutter charge is released. That is, the mirror/shutter driving mechanism 19 is ready for exposure. This angular position will be referred to as an "exposure angular position (mirror up position)" of the single-rotation cam gear 50, and the contact state at the exposure angular position between the detection brush 59 and the switch terminal 80c will be referred to as an ON state of an "exposure angular position switch". At the exposure angular position, the latch lever cam 74 is not engaged with the cam engagement arm 20b, and the force lever cam 75 is not also engaged with the engagement pins 77. Thus the latch lever is maintained at the latched position, and the force lever 76 is at the non-forcing position. Therefore, the first clutch mechanism is maintained in connection with the side of the mirror/shutter driving mechanism 19 (the cam driving gear 29), and the second clutch mechanism is ready to be connected to the winding side (wind direction gear 33) upon receiving rotation of the second sun gear 30 in the clockwise direction. As the revolution of the first planet gear 27 is prohibited under engagement with the cam driving gear 29, the driving of the motor 17 is transmitted only to the mirror/shutter driving mechanism 19, thereby the single-rotation cam gear 50 makes the forward and reverse rotations corresponding to the forward and reverse driving of the motor 17.

Figure 14:
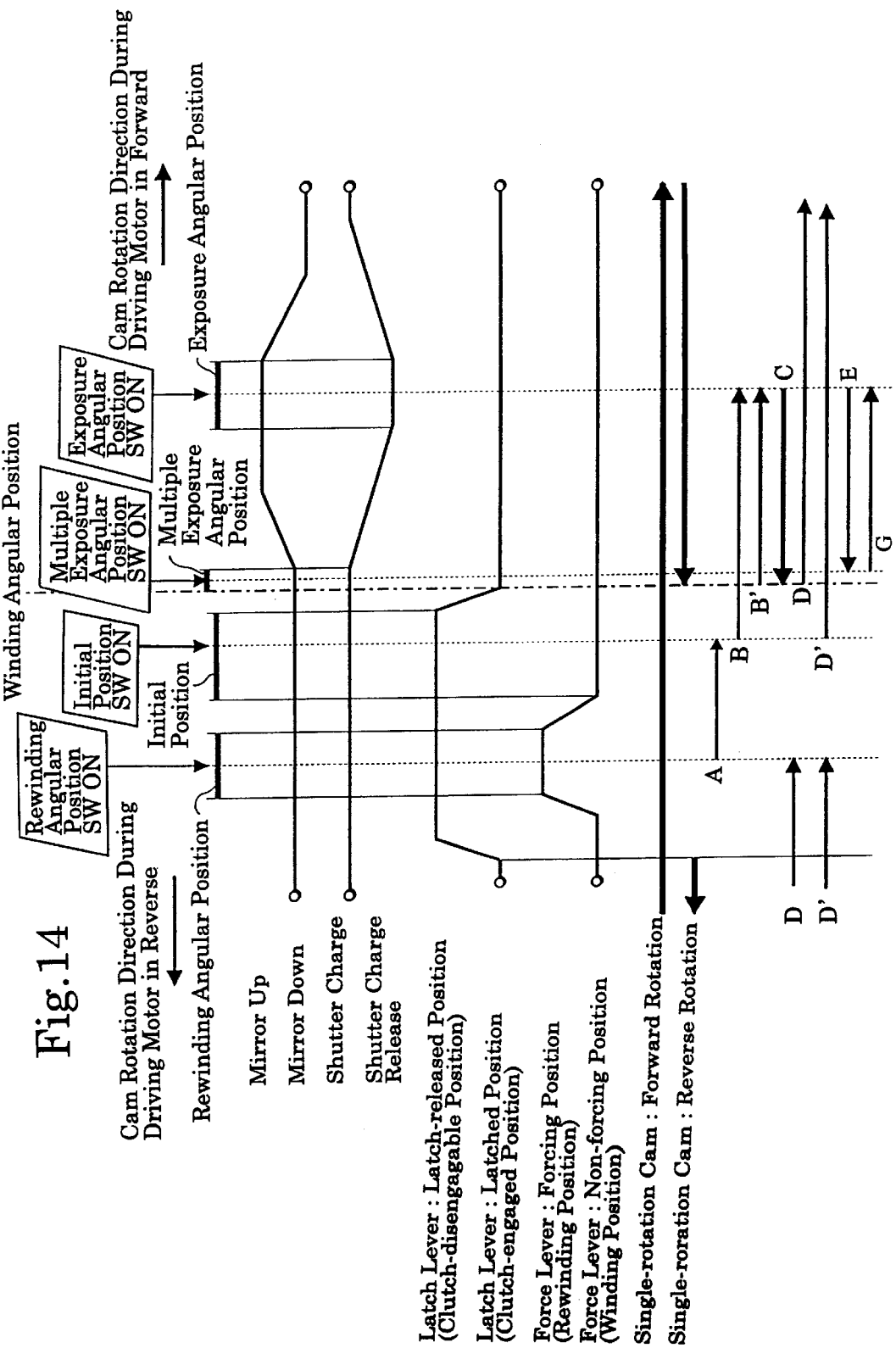
FIG. 14 is a timing chart showing a relation between a rotation of the single-rotation cam gear and control states each mechanism.

When the single-rotation cam gear 50 is at the exposure angular position, if the motor 17 drives in reverse, the single-rotation cam gear 50 rotates in reverse as long as the latch lever 20 is maintained at the latched position. Thereafter, before the switch terminal 80a becomes in contact with the detection brush 59 (that is, before reaching the initial position), the latch lever cam 74 is engaged with the cam engagement arm 20b, thereby the latch lever 20 is moved to the latch-released position against the force of the torsion spring 20c applied thereto. Since the reverse rotation of the motor 17 serves, provided that the latch of the latch lever 20 is released, as a driver in order to connect the first clutch mechanism to the film feeding mechanism 18, the first planet gear 27 starts revolving. At that time, since the driving force which has been transmitted to the cam driving gear 29 is cut, the single-rotation cam gear 50 is stopped at the position as shown in FIG. 8, which is different from the initial position (the ON state of the initial position switch) of FIG. 5. Thereafter, as illustrated in FIG. 14, when the motor 17 drives forward, the single-rotation cam gear 50 also rotates forward. However, when the motor 17 drives in reverse, the single-rotation cam gear 50 will not rotate in reverse from the position shown in FIG. 8, at which the first planet gear 27 is engaged with the second sun gear 30, thereby the second planet gear 32 revolves and engages with the wind direction gear 33. After engagement of the second planet gear 32 with the wind direction gear 33, the winding operation of the film F will start. Although the position at which the rotation of the single-rotation cam gear 50 is stopped is not detected by the switch mechanism, since the angular phase thereof is different from that of the initial position, this position will be referred to as a "winding angular position". At the winding angular position, the mirror/shutter driving mechanism 19 is in a state as shown in FIG. 3, namely the mirror is down (the observational position) and the shutter is charged.

During the reverse rotation of the single-rotation cam gear 50 from the exposure angular position to the winding angular position, the mirror 70 is at the down position and the shutter charge has been completed before the latch lever starts to move to the latch-released position by the latch lever cam 74. During this operation, the single-lens reflex camera 10 is in a state such that the mirror is down and the shutter is charged, and the detection brush 59 is in contact with the switch terminal 80d (FIG. 13) to detect the angular position of the single-rotation cam gear 50 by which the latch lever 20 is maintained at the latched position (FIG. 9).

This angular position of the single-rotation cam gear 50 is used for the multiple exposure operation, thus the position of FIG. 9 will be referred to as a "multiple exposure rotation-position", and the contact state at the exposure rotation-position between the detection brush 59 and the switch terminal 80d will be referred to as an ON state of a "multiple exposure rotation-position switch".

The multiple exposure rotation-position, the initial position and the winding angular position have a common characteristic in that the mirror/shutter driving mechanism 19 is maintained at an exposure stand-by state (mirror down and shutter charge), and from any of these positions, the exposure operation may be performed by forward rotation of the single-rotation cam gear 50. Therefore these positions will generally be referred to as a "charge position" of the single-rotation cam gear 50.

Figure 15:
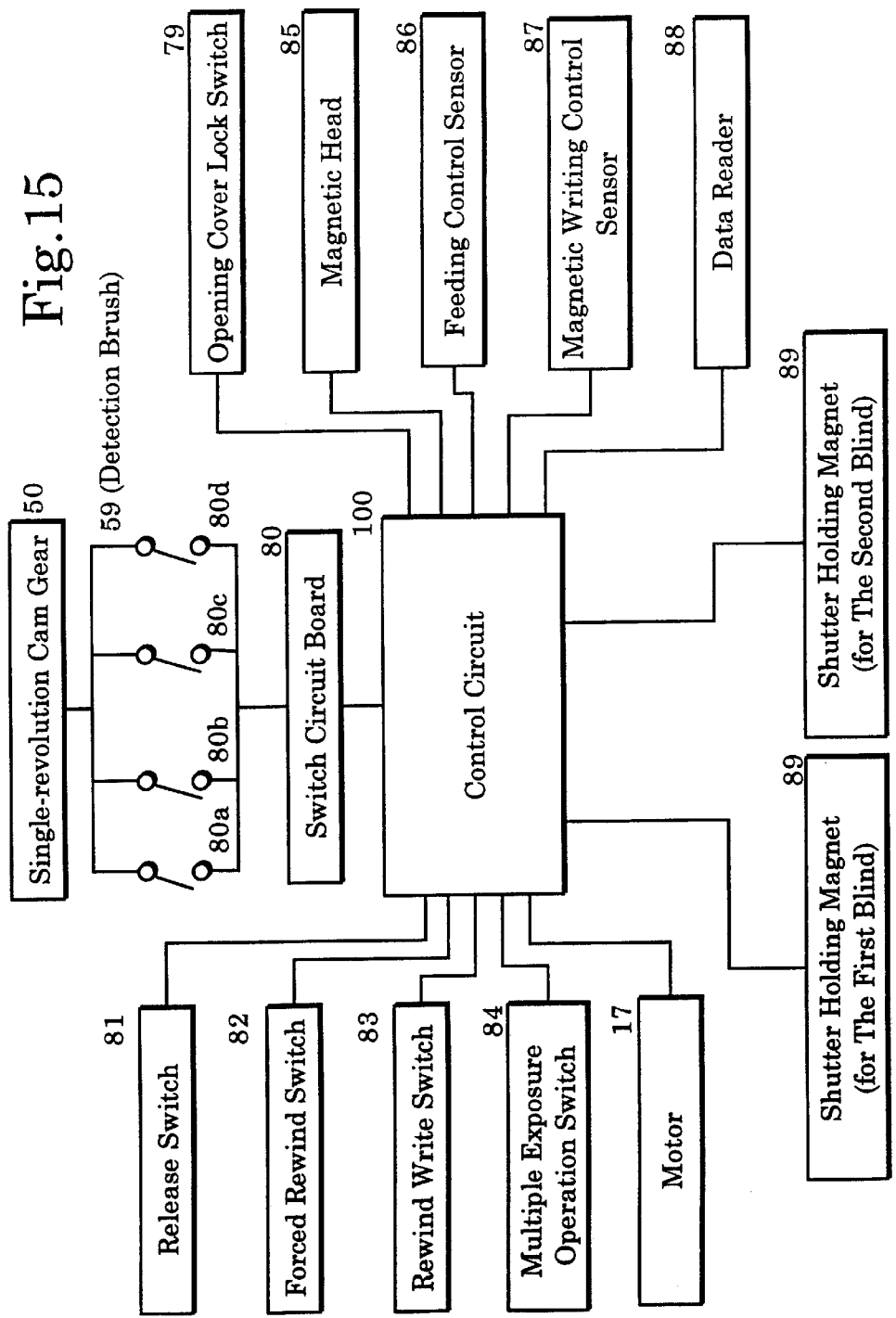
FIG. 15 is a block diagram of an electric circuit of the camera according to the present invention.
Figure 16:
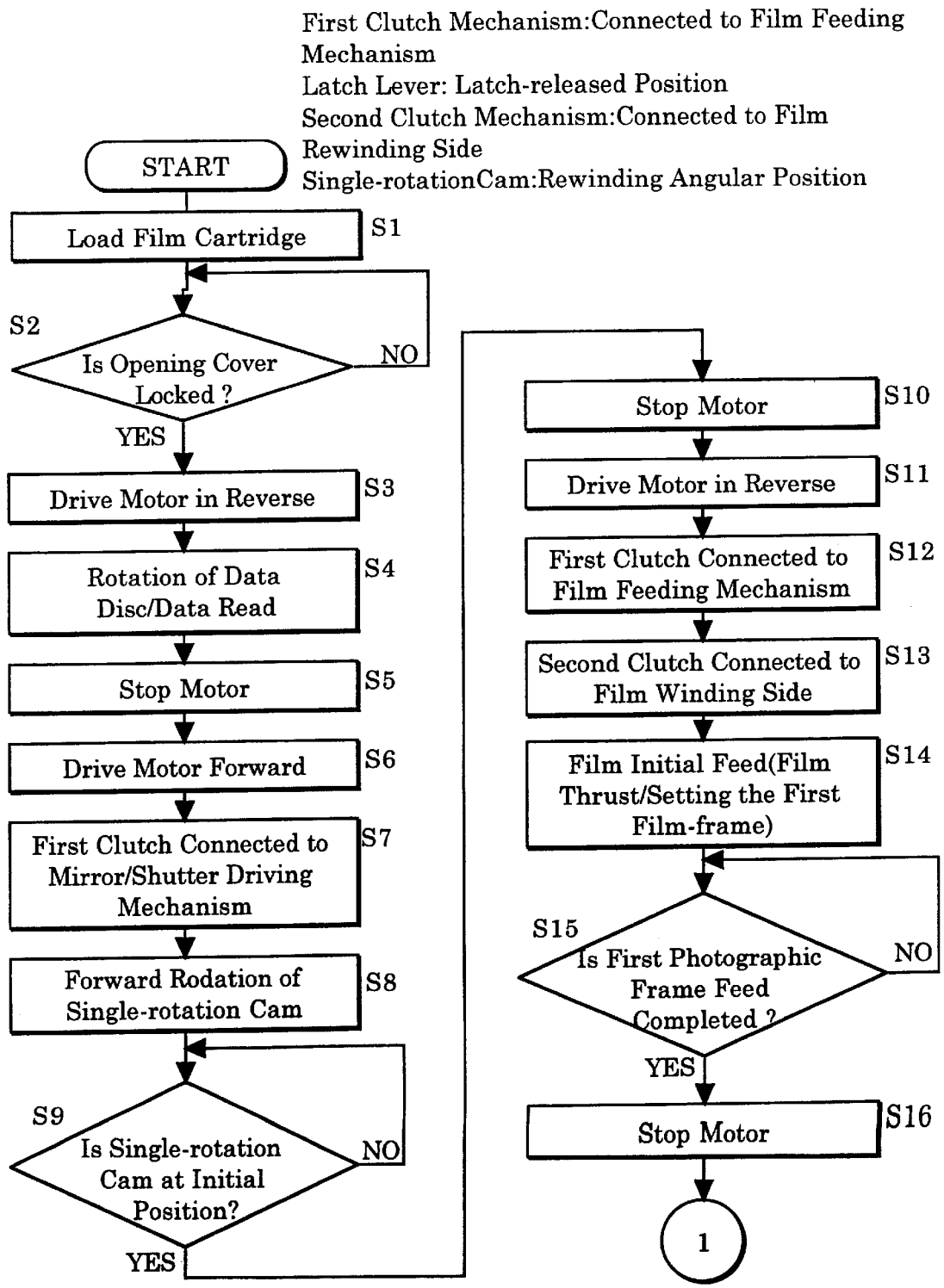
FIG. 16 is a flow chart of a film thrust (first film-frame setting) operation according to the present invention.
Figure 17:
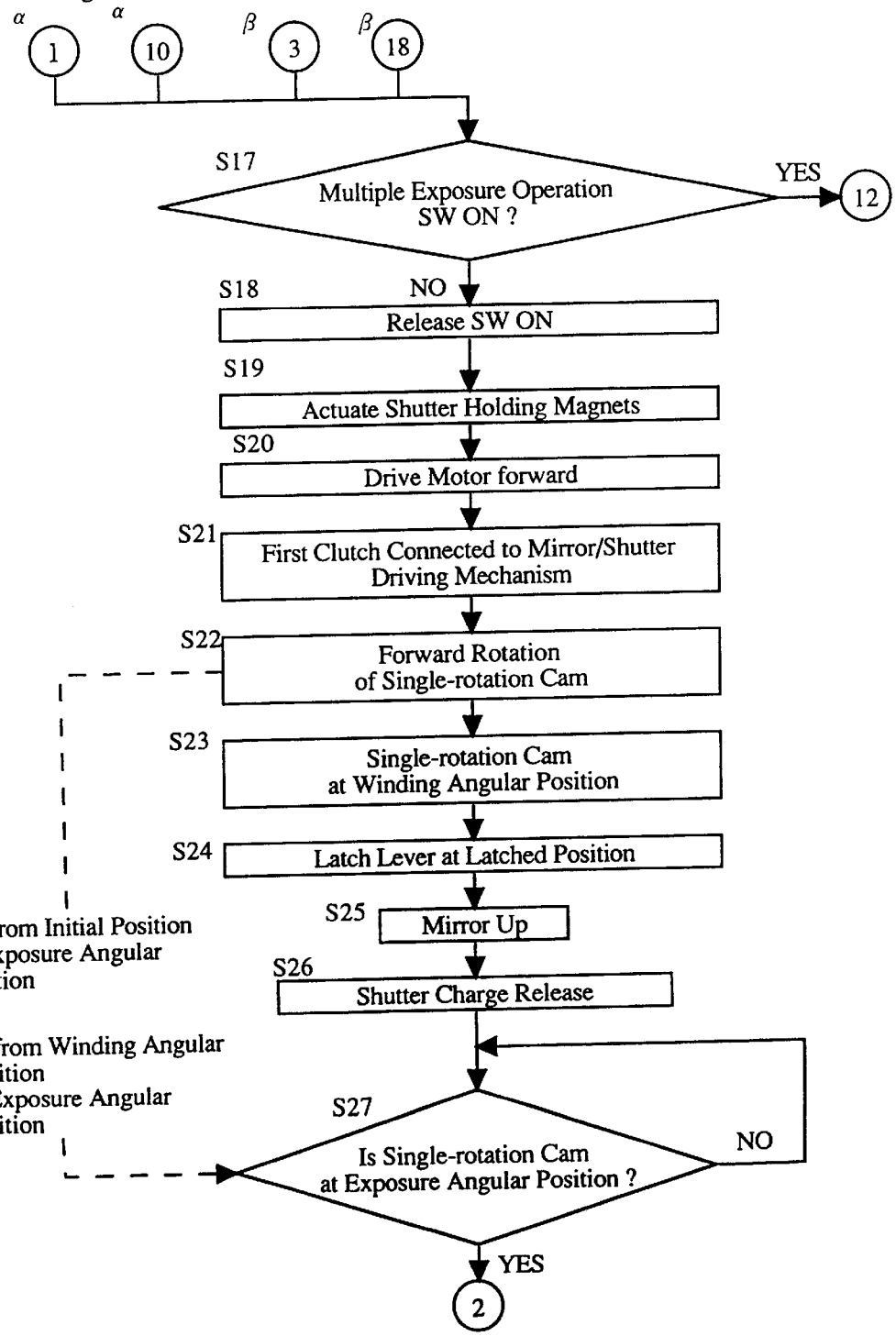
FIG. 17 is a flow chart of a former half of a release operation according to the present invention.
Figure 18:
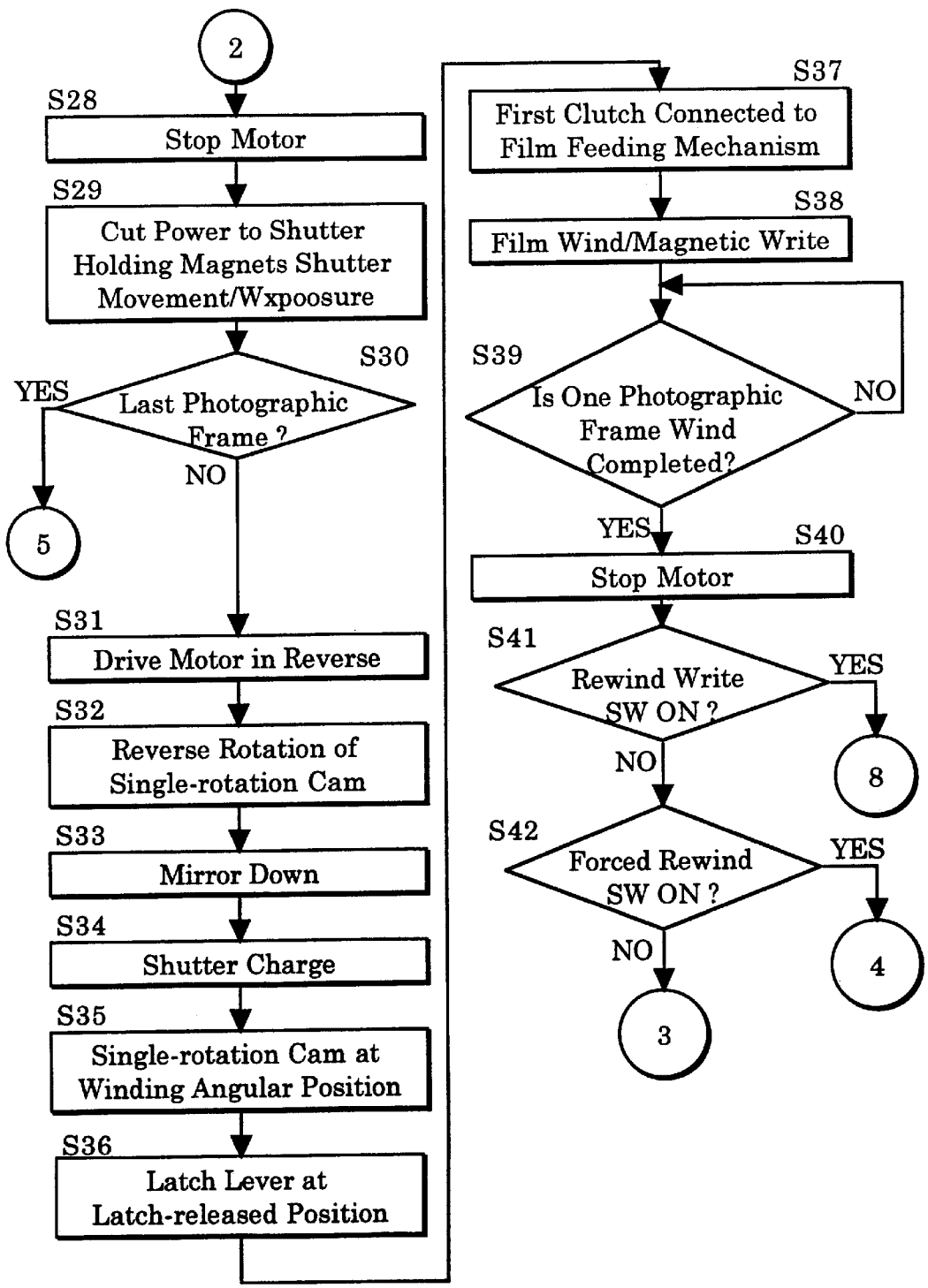
FIG. 18 is a flow chart of a latter half of the release operation of FIG. 17 according to the present invention.
Figure 19:
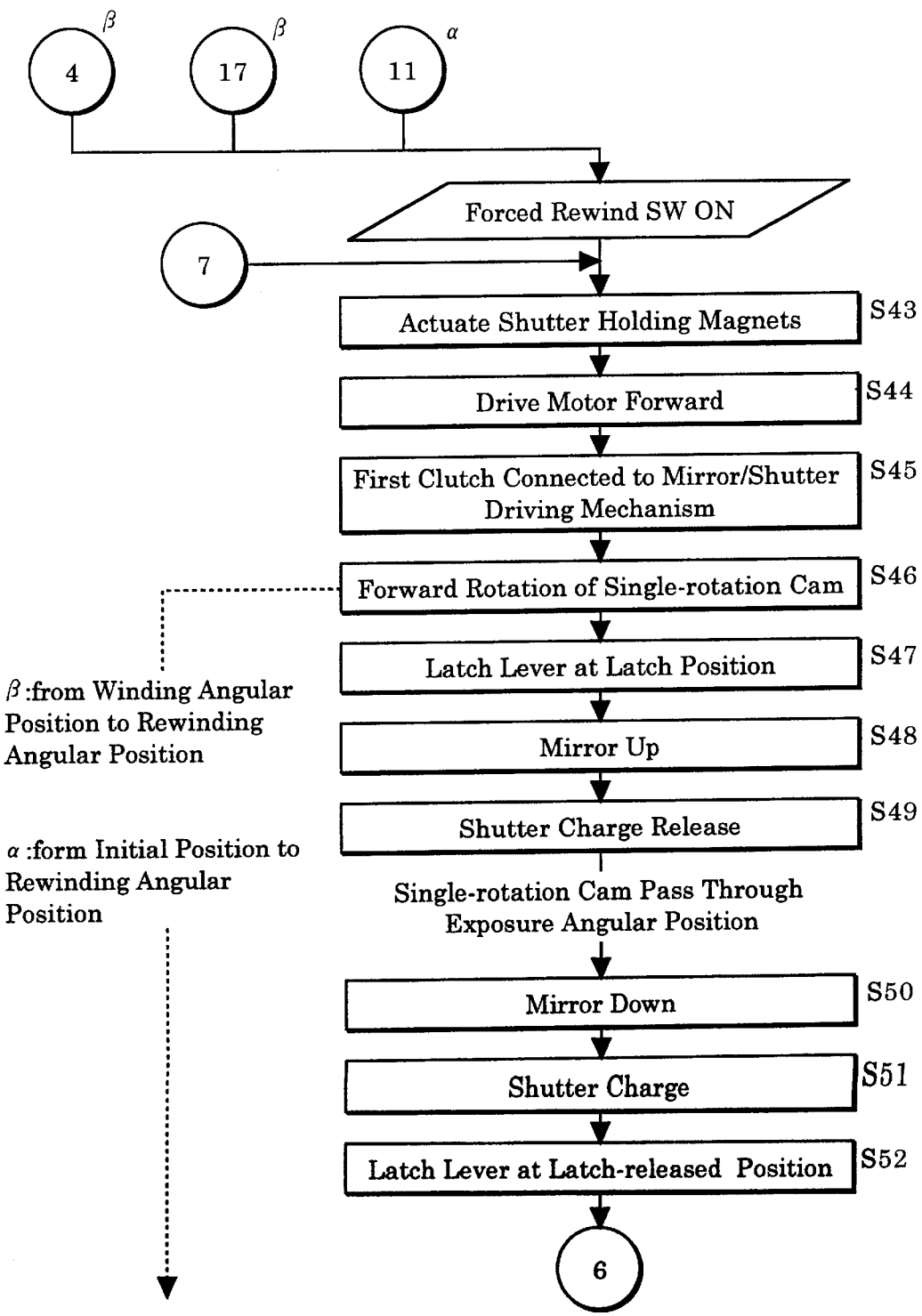
FIG. 19 is a flow chart of a former half of a forced rewinding operation when a film is halfway wound according to the present invention.
Figure 20:
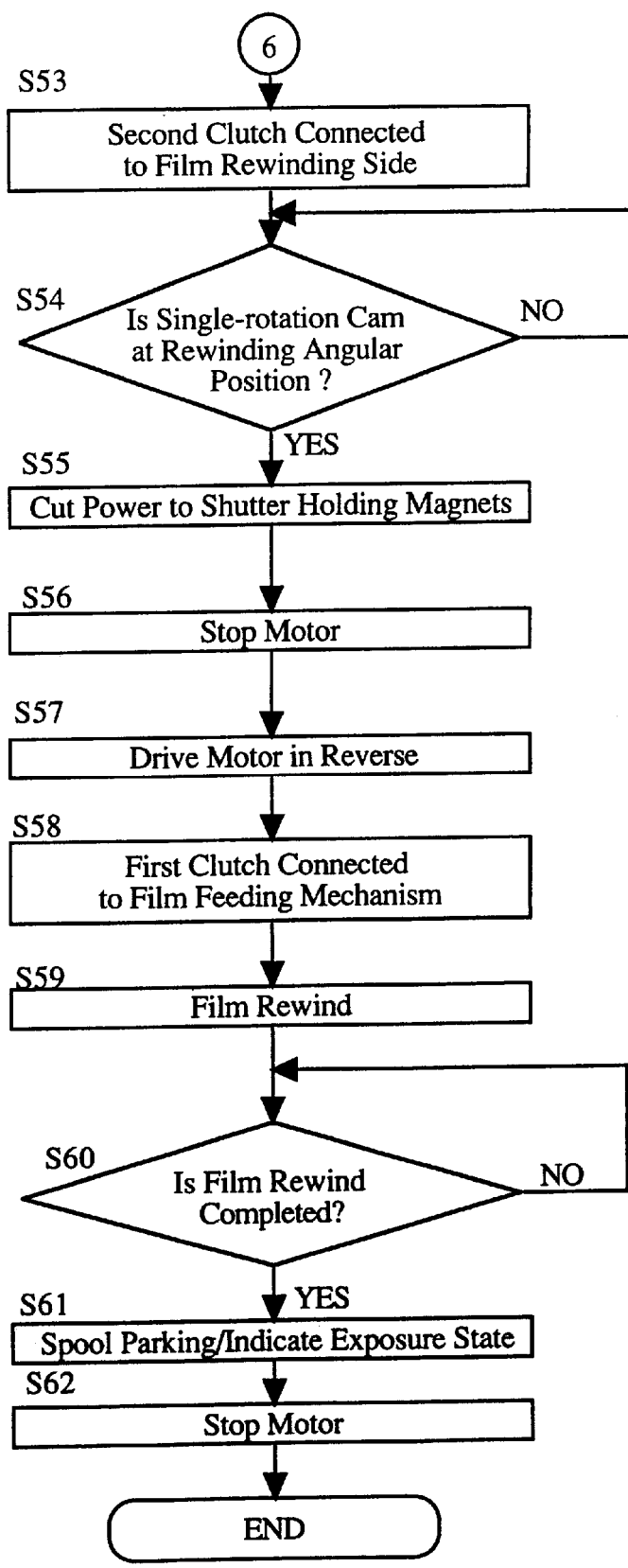
FIG. 20 is a flow chart of a latter half of the forced rewinding operation of FIG. 19 according to the present invention.

FIG. 15 illustrates an electric circuit block diagram of the single-lens reflex camera 10. The angular position of the single-rotation cam gear 50 is detected by the control circuit 100 through the detection brush 59 and the switch circuit board 80. The angular position of the single-rotation cam gear 50 may be detected, instead of the switch circuit board 80, by a code plate which detects the angular position of the single-rotation cam gear 50 in slidable contact with a plurality of terminals of the detection brush 59. The camera 10 is provided with a release switch 81 to be operated externally, a forced rewind switch 82, a rewind write switch 83 and a multiple exposure operation switch 84. Each switch is connected to the control circuit 100, to which the ON/OFF signal of each switch is input. There is also an opening cover lock switch 79 to detect the locked state of the opening cover 14a of the film cartridge storage chamber 14, of which signal is also input in the control circuit 100.

The camera 10 is further provided with a magnetic head 85 controlled by the control circuit 100. The magnetic head 85 can write encoded magnetic information on a magnetic layer of the film F, such as photographic conditions (whether or not a strobe is used, etc.), date, number of extra copies, a message, etc. As illustrated in FIG. 2, the magnetic head 85 is positioned closer to the winding spool chamber 15 than the photographic optical axis in the direction of feed of the film F, thus the writing of the magnetic information is carried out during winding after exposure of the corresponding frame of the film F. The rewind write is the function which subsequently rewrites (amends) the magnetic information that has already been written. Although the function will be discussed in detail afterwards, it should be noted in advance that, during the rewind write, it is necessary to rewind the exposed photographic frame which has been wound out once to the photographic position at the rear end of the photographic optical path 13, so that the magnetic writing may be carried out by feeding the corresponding frame again in the film feeding direction.

A film feeding control sensor 86 which detects the perforations P provided at each frame of the film F is connected to the control circuit 100. The feeding amount and the rewind amount (frame position) of the film F can be detected by the film feeding control sensor 86. The timing for the start of the magnetic writing by the magnetic head 85 is controlled by the control circuit 100 through a magnetic writing control sensor 87 which also detects the perforations P. There is a data reader 88 inside the film cartridge storage chamber 14, which reads the data disk 99 of the film cartridge 90. The read data is then input into the control circuit 100.

The above described motor-driven single-lens reflex camera 10 can execute, only by controlling the direction of rotation and amount of rotation of the motor 17 through detecting the angular position of the single-rotation cam gear 50, the following operations:

1. Film thrust (first film-frame setting) operation when loading the film cartridge;
2. Release operation (photographing operation per frame);
3. Forced rewind operation from an intermediate position of the film;
4. Automatic rewind operation from the end of film;
5. Rewind write (magnetic rewriting) operation; and
6. Multiple exposure operation.

The control of each operation will now be described with reference to flow charts of FIGS. 16 through 25. As above discussed, the "forward driving" of the motor 17 refers to the driving of the output shaft 17a in the counterclockwise direction as viewed from the underside of the camera body 11. Similarly, the "reverse driving" of the motor 17 refers to the driving of the output shaft 17a in the clockwise direction as viewed from the underside of the camera body 11. The directions of driving or rotation of the single-rotation cam gear 50, the first and the second clutch mechanisms, and other gears, are all determined as viewed from the underside of the camera body 11 (FIGS. 2, 5 through 9). In particular, the clockwise rotation of the single-rotation cam gear 50 is referred to as "forward rotation", and the counterclockwise direction thereof is referred to as "reverse rotation".

[1. Film Thrust (first film-frame setting) Operation]

When the film cartridge 90 is not loaded in the film cartridge storage chamber 14, the previous film cartridge is in a rewound state. The first clutch mechanism is connected to the film feeding mechanism 18, and the second clutch mechanism is connected to the rewinding side. Namely, the first planet gear 27 is engaged with the second sun gear 30, and the second planet gear 32 is engaged with the rewind direction gear 34. The single-rotation cam gear 50 is at the rewinding angular position, in which the latch lever cam 74 moves the latch lever 20 to the latch release position, and the force lever cam 75 moves the force lever 76 to the forcing position (see FIG. 6).

Subsequently, the opening cover 14a can be opened, the film cartridge 90 can be loaded in the film cartridge storage chamber 14, and the opening cover 14a is closed. Through this open/close operation, the opening cover 14a is locked, and the light-shielding door 97 is opened at step S1. When the opening door 14a is locked, the locking signal is input in the control circuit 100, and upon receiving the locking signal at step S2, the motor 17 reverses (step S3). Since the reverse driving of the motor 17 rotates the first sun gear 26 in the clockwise direction, the first clutch mechanism accordingly maintains the engagement of the film feeding mechanism 18, thus the rewind direction gear 34 is rotated in the clockwise direction, and the cartridge spool driving shaft 42 (the cartridge spool 92) is rotated in the counter-clockwise direction via the reduction gear train 40. The rotation of the cartridge spool 92 is currently in the rewind direction, thus the film F is not fed out of the film cartridge 90, and the cartridge spool 92 makes slip rotation inside the housing 91. During this operation, the data reader 88 reads the recorded information of the data disk 99 integrally rotating with the cartridge spool 92, thereby the photographic frame number of the film, the film speed, etc. are input in the control circuit 100 (step S4).

When the reading of the data disk 99 is completed, the motor 17 is stopped (step S5), then the motor 17 drives forward (step S6). The forward driving of the motor 17 serves to move the second clutch mechanism, which is currently engaged with the rewinding side, to be engaged with the winding side. When the first sun gear 26 is rotated in the counterclockwise direction upon receiving the forward driving of the motor 17, the first planet gear 27 revolves to be engaged with the cam driving gear 29 (step S7). Thus the single-rotation cam gear 50 rotates forward starting from the rewinding angular position (step S8). This forward rotation of the single-rotation cam gear 50 removes the force lever cam 75 from the engagement pins 77, thus the force lever 76 no longer exerts force. Accordingly, the force lever 76 is moved to the non-forcing position by an elastic force of the torsion spring 46, thereby the second planet gear 32 becomes ready to be engaged with the wind direction gear 33. That is, the second clutch mechanism is ready to engage the winding side. When the switch terminal 80*a* becomes in contact with the detection brush 59 to detect that the single-rotation cam gear 50 has rotated to the initial position (step S9, FIG. 5), the motor 17 is stopped (step S10). At the initial position, the latch lever cam 74 maintains the latch lever 20 at the latch-released position, hence the connection of the first clutch mechanism can be switched corresponding to the direction of driving of the motor 17. The single-rotation cam gear 50 rotates forward between steps S8 and S10, as illustrated by an arrow A in FIG. 14, and the operations concerning the mirror 70 and the shutter charge will not be carried out in these steps.

Thereafter, when the motor 17 drives in reverse again (step S11), the connection of the first clutch mechanism (the first planet gear 27) is switched to the side of the film feeding mechanism 18 (the second sun gear 30) at step S12, thus the second planet gear 32 engages with the wind direction gear 33 due to rotation of the second sun gear 30 in the clockwise direction. Accordingly, the second clutch mechanism is connected to the winding side (step S13), and the driving force is transmitted to the winding spool 16 as well as to the cartridge spool 92, thereby the feeding of the film F is started by rotations of the both spools 16 and 92 in the clockwise direction (step S14). In an initial state of this film feeding, the film F makes the self-feeding toward the winding spool 16 only by the rotative power of the cartridge spool 92. When the top of the film F is wound by the winding spool 16, the film F is essentially wound by the winding force of the winding spool 16 having a faster rotation speed. When the film feeding control sensor 86 detects the completion of feeding of the first photographic frame (step S15), the reverse driving of the motor 17 is stopped to enter a stand-by photographing state (step S16). At this step, since the single-rotation cam gear 50 is at the initial position, the mirror 70 is maintained at the observational position as shown in FIG. 3, hence a photographer may observe an object from the viewfinder.

[2. Release Operation (photographing operation per frame)]

When the first film-frame setting as above discussed is completed, the single-rotation cam gear 50 is at the initial position, the first clutch mechanism is engaged with the film feeding mechanism 18, and the second clutch mechanism is engaged with the winding side. In this state, as the single-rotation cam gear 50 is at the initial position, the latch lever 20 is at the latch-released position, thus it is possible to perform the multiple exposure operation by turning ON the multiple exposure operation switch 84 (step S17). The multiple exposure operation will be described in detail afterwards. When the release switch 81 is turned ON by not selecting the multiple exposure operation at step S17 (step S18), the control enters the ordinary release operation as described below.

When the shutter release signal is input in control circuit 100, electric power is initially supplied to the shutter holding magnets 89 so that the shutter is electromagnetically held (step S19), then the motor 17 makes the forward driving (step S20). The forward driving of the motor 17 switches the first clutch mechanism, which has been connected to the film feeding mechanism 18, to engage the mirror/shutter driving mechanism 19 (step S21), thus the single-rotation cam gear 50 starts the forward rotation from the initial position (step S22). Thereafter, when the single-rotation cam gear 50 reaches the winding angular position through the forward rotation thereof (step S23, FIG. 8), the engagement of the latch lever cam 74 with the latch lever 20 is released, thus the latch lever 20 is moved to the latched position due to the elastic force of the torsion spring 20*c*, thereby the first clutch mechanism engages with the mirror/shutter driving mechanism 19 (step S24).

When the single-rotation cam gear 50 continues rotating forward, the follower pin 56 of the driving lever 55 is guided to the eccentric cam section 54 of the cam groove 52, thereby the driving lever 55 is rotated in the clockwise direction. Accordingly, the charge lever 64 is rotated via the first link 60 and the second link 62 to go up from the position as shown in FIG. 3 to that of FIG. 4, hence the mirror operation portion 67 lifts the mirror sheet 70*a* so that the mirror 70 can go up to the photographic position (step S25). Therefore, since the shutter charge protrusion 66 also goes up, the shutter charge is released (step S26), thereby the camera 10 becomes ready for exposure. When the ON signal of the exposure angular position switch (the contact state between the switch terminal 80*c* and the detection brush 59) is input in the control circuit 100 (step S27, FIG. 7), the motor 17 is stopped (step S28). The shutter is held only by the shutter holding magnets 89 at step S28, and the mirror 70 is set away from the photographic optical path 13 at an upward position. In this state, the power supplied to the two shutter holding magnets 89 are turned OFF, so that the first blind and the second blind of the shutter may be actuated at a predetermined time lag, in order to expose the film F (step S29). The single-rotation cam gear 50 makes the forward rotation between the steps S22 and S28, as illustrated by an arrow B in FIG. 14.

Figure 21:
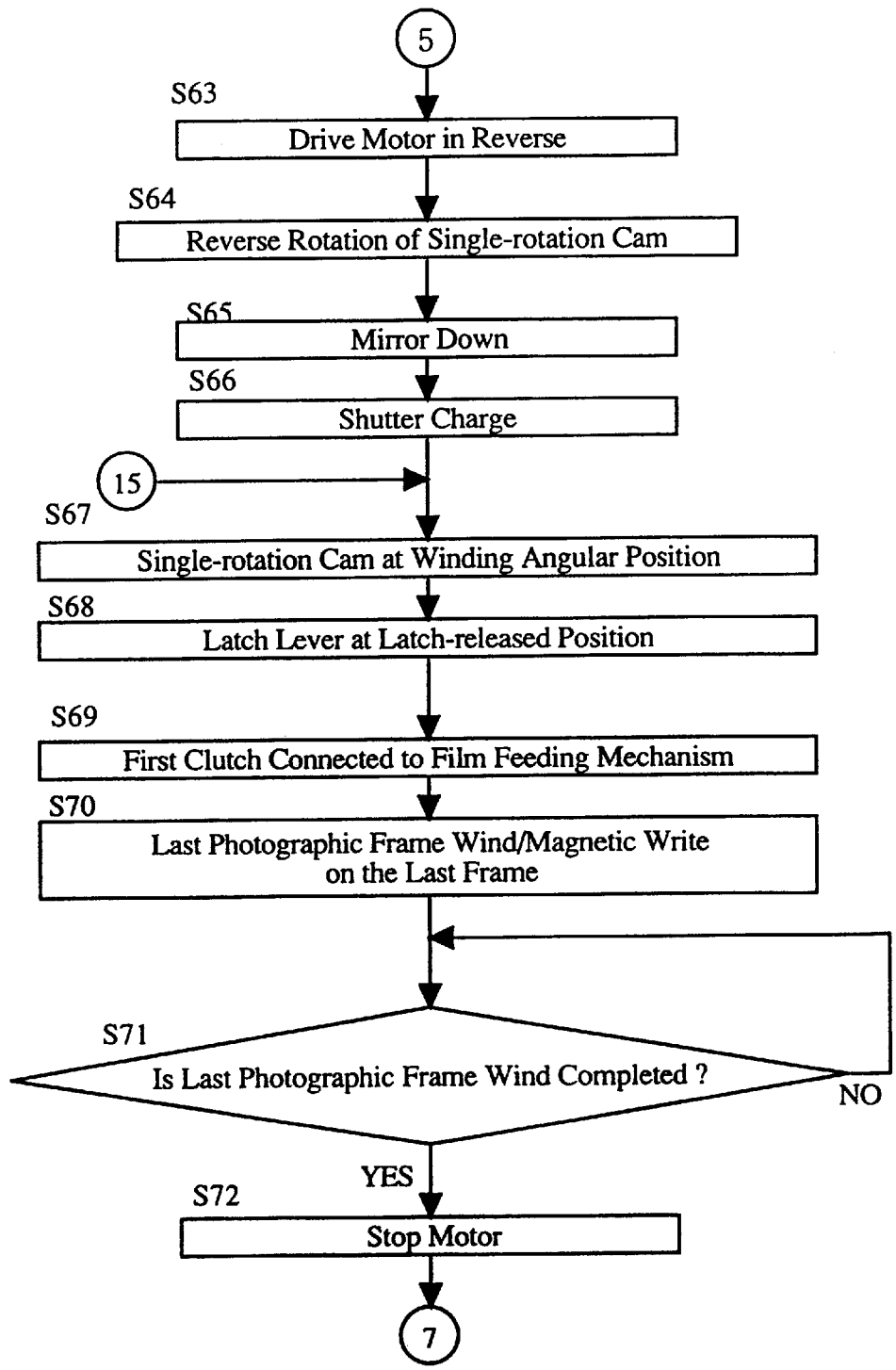
FIG. 21 is a flow chart of an automatic rewinding operation from the last frame of film according to the present invention.

The control circuit 100 stores the data in regard to the number of photographed frames read from the data disk 99 at step S4. After completion of exposure, according to the data of the number of the photographed frames, if the current exposed frame is the last photographic frame of the film F, the control proceeds to the automatic rewind operation as shown in FIG. 21, and if the current exposed frame is not the last photographic frame, the film is wound to feed the next photographic frame (step S30). If the current frame is not the last photographic frame, the motor 17 initially reverses after completion of exposure in order to put down the mirror 70 (step S31). As the first clutch mechanism is fixed be connected to the mirror/shutter driving mechanism 19 by the latch lever 20 at the exposure angular position, the reverse driving of the motor 17 starts the reverse rotation of the single-rotation cam gear 50 from the exposure angular position (step S32). The reverse rotation thereof guides the follower pin 56 from the eccentric cam section 54 to the concentric cam section 53, thus the driving lever 55 rotates in the counterclockwise direction, thus the charge lever 64 is rotated via the first link 60 and the second link 62 to go down from the position as shown in FIG. 4 to that of FIG. 3. The down operation of the charge lever 64 releases the lifting of the mirror operation portion 67, thus the mirror 70 goes down to the observational position due to the elastic force of the torsion spring 72 (step S33). The charge lever 64 also rotates simultaneously in the downward direction, hence the shutter charge is carried out by the shutter charge protrusion 66 (step S34).

When the single-rotation cam gear 50 reaches the winding angular position step S35, FIG. 8), the latch lever cam 74 becomes engaged with the latch lever 20 to move the latch lever 20 to the latch-released position again (step S36) to allow revolution of the first planet gear 27. Thus the first planet gear 27 revolves toward the second sun gear 30 in order to switch the first clutch mechanism to be connected to the film feeding mechanism 18 (step S37). The single-rotation cam gear 50 no longer receives transmission drive, and is stopped at the winding angular position. Conversely, since the second clutch mechanism at the winding angular position is ready to be connected to the winding side, the film feeding mechanism 18 engaged with the reverse driving of the motor 17 rotates the winding spool 16 and the cartridge spool 92 in the clockwise direction (the film feeding direction), thereby the winding. of the film F is carried out (step S38). During this winding operation, the magnetic writing on the film F by the magnetic head 85 is executed. The start timing of the magnetic writing is controlled by the control circuit 100 through the magnetic writing control sensor 87. The single-rotation cam gear 50 makes the reverse rotation between the steps S32 and S35, as illustrated by an arrow C in FIG. 14. When the film feeding control sensor 86 detects the completion of winding by one photographic frame (step S39), the motor 17 is stopped to enter the stand-by state of the release operation of the next photographic frame (step S40).

In this stand-by state, it is possible to enter the rewind write operation which will be described in detail afterwards, by turning ON the rewind write switch 83 (step S41). When the forced rewind switch 82 is turned ON without turning ON the rewind write switch 83 (step S42), the control proceeds to the forced rewind operation from an intermediate position of the film F. Further, when either the rewind write switch 83 or the forced rewind switch 82 is not turned ON, the control is returned to step S17 to repeat the release (photographing) operation. However, from the second photographic frames, the forward rotation of the single-rotation cam gear 50 between steps S22 and S28 will not start from the initial position but from the winding angular position, as shown by an arrow B' in FIG. 14.

[3. Forced Rewind Operation from an Intermediate Position of the Film]

When the release operation as disc ussed above is completed (step S40), the single-rotation cam gear 50 is at the winding angular position, the first clutch mechanism is connected to the film feeding mechanism 18, and the second clutch mechanism is connected to the winding side. Further, the latch lever 20 is at the latch-released position. In this state, when the forced rewind switch 82 is turned ON (step S42), the control circuit 100 initially supplies electric power to the shutter holding magnets 89 (step S43), then the motor 17 makes the forward driving (step S44). The forward driving of the motor 17 switches the first clutch mechanism to be connected to the mirror/shutter driving mechanism 19 (step S45), thus the single-rotation cam gear 50 starts the forward rotation from the winding angular position (step S46) in order to switch the second clutch mechanism to be connected to the rewinding side. As described above, since the single-rotation cam gear 50 cannot make the reverse rotation from the winding angular position, the motor 17 should make the forward driving to make the forward rotation of the single-rotation cam gear 50 from the winding angular position to the rewinding angular position. During this forward rotation, as the single-rotation cam gear 50 passes through the exposure angular position (FIG. 7), the mirror 70 goes up and down, the shutter charge 20 is released, and the shutter is then charged again (steps S47 through S52). The shutter has been held by the shutter holding magnets 89 at step S43 so that the shutter cannot be actuated in a state that the shutter charge is released (step S49) to prohibit exposure of the film F. When the single-rotation cam gear 50 approaches the rewinding angular position, the latch lever 20 becomes engaged with the latch lever cam 74 to be moved to the latch-released position (step S52).

When the single-rotation cam gear 50 continues rotating forward, the force lever cam 75 becomes engaged with the engagement pins 77, thereby the force lever 76 is moved to the forcing position so that the second clutch mechanism is switched to be engaged with the rewinding side (step S53). Therefore, when the rewinding angular position switch is turned ON through contact between the detection brush 59 and the switch terminal 80b (step S54, FIG. 6), the power supply to the shutter holding magnets 89 is cut (step S55), thereby the motor 17 is stopped to maintain the second clutch mechanism to be connected to the rewinding side (step S56). The single-rotation cam gear 50 makes the forward rotation between the steps S46 and S56, as illustrated by an arrow D in FIG. 14.

Thereafter, when the motor 17 drives in reverse (step S57), the revolution of the first planet gear 27 is not restrained since the latch lever 20 is at the latch-released position, thus the first clutch mechanism is switched to be engaged with the film forwarding mechanism 18 (step S58). When the reverse driving of the motor 17 is continued, the rewind direction gear 34 is rotated in the counterclockwise direction via the second planet gear 32. The rotation of the rewind direction gear 34 then rotates the cartridge spool driving shaft 42 in the counterclockwise direction, the film F is rewound by the cartridge spool 92 (step S59). The winding spool 16 will not be rotated by means of an one-way clutch provided in the rewind direction gear 34 at this time, hence the rewind of the film F is carried out only by the driving force of the cartridge spool driving shaft 42. The control circuit 100 counts the number of rewound photographic frames during the rewind operation, and when all the frames are judged to be rewound inside the film cartridge 90 (step S60), the cartridge spool 92 is rotated to the predetermined rotative phase so that the indicating plate 96 faces the exposure state indication hole 94 which indicates the partial exposure (step S61), then the motor 17 is stopped (step S62). After the motor 17 is stopped, the opening cover 14a is unlocked to unload the film cartridge 90 from the film cartridge storage chamber 14. The photographer may confirm the exposure state of the unloaded film cartridge 90 by the exposure state indication holes 94.

[4. Automatic Rewind Operation from the End of Film]

When the forced rewind operation is not executed, the control enters the automatic rewind operation as illustrated in FIG. 21, provided that the photographic frame is the last frame at step S30 of the release operation. Likewise the case of the ordinary photographing operation, the mirror/shutter driving mechanism 19 should be resumed to the initial state at the last photographic frame, and the rewinding operation should also be performed in order to execute the magnetic writing operation. Therefore the motor 17 reverses after exposure of the last frame (step S63). Accordingly, the single-rotation cam gear 50 starts the reverse rotation from the exposure angular position (step S64), then the mirror goes down (step S65) and the shutter is charged (step S66). When the single-rotation cam gear 50 reaches the winding angular position (step S67, FIG. 8), the latch lever 20 is moved to the latch-released position (step S68) to switch the transmission of the reverse driving of the motor 17 to be connected to the film feeding mechanism 18 (step S69). Thus the reverse driving of the motor 17 winds the last photographic frame to execute the magnetic writing operation on the last photographic frame by using the magnetic head 85 (step S70). When the film feeding control sensor 86 detects the completion of winding of the last photographic frame (step S71), the motor 17 is stopped (step S72). Then the control automatically proceeds to step S43 in FIG. 19 to execute the forced rewind operation. However, apart from the case of the forced rewind operation as above described, the stop position of the cartridge spool 92 at step 61 is controlled so that the indicating plate 96 is faced to the exposure state indication hole 94 which indicates the exposed state.

[5. Rewind Write (magnetic information rewriting) Operation]

Figure 22:
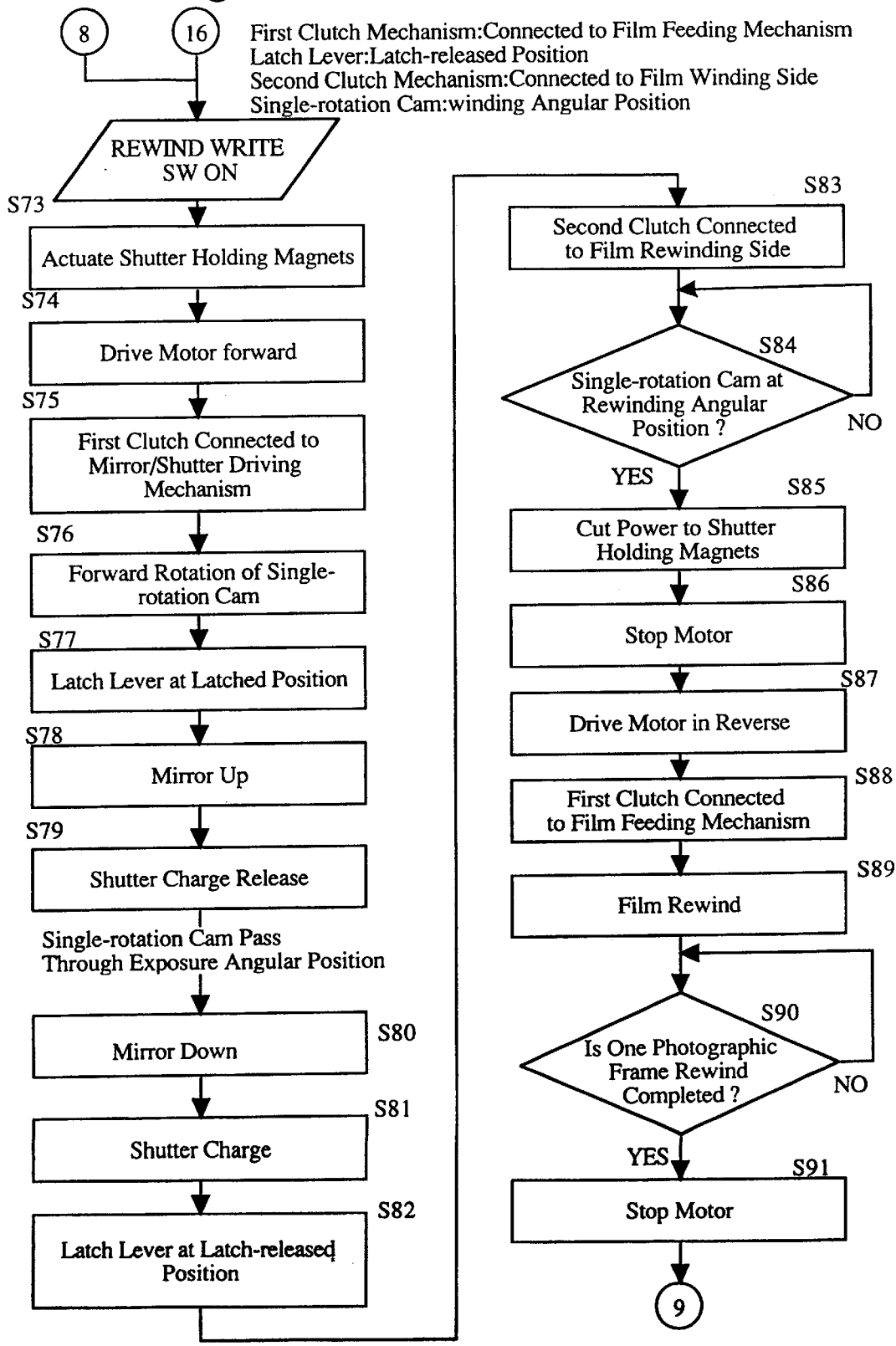
FIG. 22 is a flow chart of a former half of a rewind write operation according to the present invention.
Figure 23:
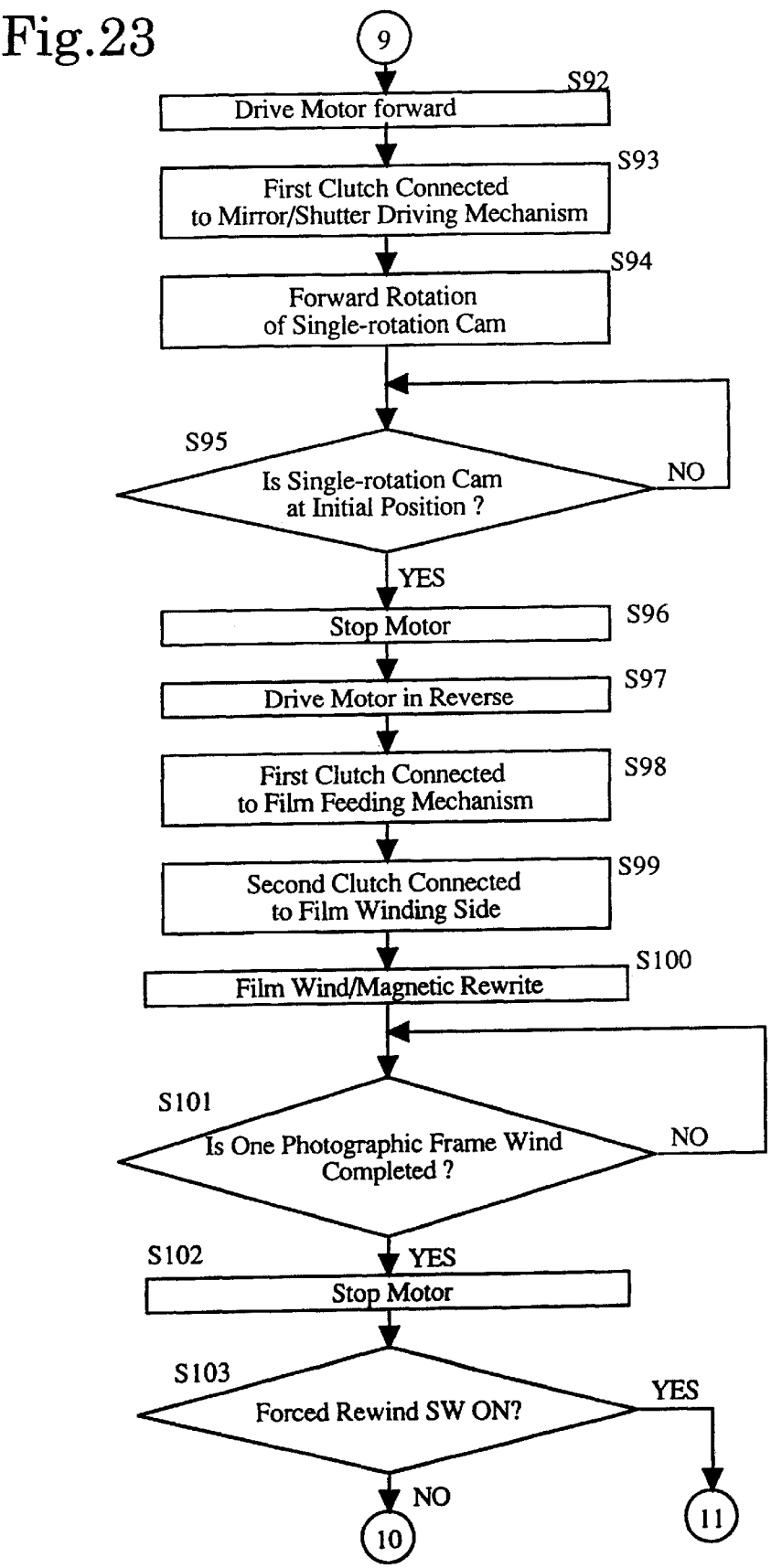
FIG. 23 is a flow chart of a latter half of the rewind write operation of FIG. 22 according to the present invention.

When the release operation as above discussed is completed (step S40), the single-rotation cam gear 50 is at the winding angular position, the first clutch mechanism is connected to the film feeding mechanism 18, and the second clutch mechanism is connected to the winding side. In this state, when the rewind write switch 83 is turned ON at step S41, the control enters the rewind write operation as illustrated in FIGS. 22 and 23. Initially, the control circuit 100 supplies the electric power to the shutter holding magnets 89 to hold the shutter (step S73), then the motor 17 makes the forward driving (step S74). The forward driving of the motor 17 corresponds to the preparation of rewind of the exposed photographic frames to the photographic position again, in which the first clutch mechanism is switched to be connected to the mirror/shutter driving mechanism 19 (step S75), thus the single-rotation cam gear 50 starts the forward rotation from the winding angular position (step S76). At that time, the single-rotation cam gear 50 makes the forward rotation as shown by arrows D in FIG. 14, thus the same operations as those of the rewind operation mentioned at steps S47 through S52, such as letting the mirror 70 down, etc., are executed (steps S77 through S82), but the film F will not be exposed again since the shutter is held by the shutter holding magnets 89. When the force lever cam 75 becomes engaged with the engagement pins 77, the force lever 76 is moved to the forcing position so that the second clutch mechanism is switched to be connected to the rewinding side (step S83). When the rewinding angular position switch of the single-rotation cam gear 50 is turned ON (step S84, FIG. 6), the power supply to the shutter holding magnets 89 is cut (step S85), thereby the motor 17 is stopped, maintaining the second clutch mechanism engaged with the rewinding side (step S86). Thereafter, when the motor 17 reverses (step S87), since the latch lever cam 74 of the single-rotation cam gear 50 maintains the latch lever 20 at the latch-released position, the first clutch mechanism is switched to be connected to the film forwarding mechanism 18 (step S88). When the reverse driving of the motor 17 is continued, the cartridge spool driving shaft 42 is rotated in the counterclockwise direction, thereby the film F is rewound (step S89). When the film feeding control sensor 86 detects the completion of film rewind by the amount of one photographic frame (step S90), the motor 17 is stopped (step S91).

According to operation as the above discussed, the photographic frame on which the magnetic data has been written is returned to the photographic position at the rear end of the photographic optical path 13. Thereafter, the motor 17 makes the forward driving as the preparation of feeding of the film F (step S92) to switch the first clutch mechanism to be connected to the mirror/shutter driving mechanism 19 (step S93). When the motor 17 continues driving forward, the single-rotation cam gear 50 starts the forward rotation from the rewinding angular position (step S94). This forward rotation of the single-rotation cam gear 50 serves to disengage the force lever cam 75 from the engagement pins 77, thereby the force lever 76 is resumed to be at the non-forcing position. In the case of the forward rotation of the single-rotation cam gear 50, the angular position detected after the rewinding angular position is the initial position. Therefore, when the detection brush 59 becomes in contact with the switch terminal 80a (step S95, FIG. 5), the motor 17 is stopped (step S96). The single-rotation cam gear 50 makes the forward rotation between steps S94 and S96, as illustrated by an arrow A in FIG. 14.

Thereafter, when the motor 17 reverses (step S97), as the latch lever 20 is at the latch-released position, the connection of the first clutch mechanism is switched to the side of the film feeding mechanism 18 (step S98). Accordingly, the second clutch mechanism engaged with the reverse driving of the motor 17 is engaged with the winding side (step S99), and the film F is wound both by the winding spool 16 and the cartridge spool driving shaft 42. The rewriting of the magnetic information by the magnetic head 85 is carried out during this winding operation (step S100). As the rewriting is completed during the winding operation of the corresponding photographic frame, when the completion of winding by the amount of one photographic frame is detected (step S101), the motor 17 is stopped to complete the rewind write operation (step S102). It is possible at this time to enter the forced rewind operation as above described (see FIGS. 19 and 20) by turning ON the forced rewind switch 82 (step S103). When the forced rewind operation is not executed, since the unexposed photographic frame is currently positioned at the rear end of the photographic optical path 13, it is also possible to enter the release operation starting from step S17 (see FIGS. 17 and 18). In this regard, it should be noted that, when the rewind write operation is completed, the single-rotation cam gear 50 is at the initial position like in the case of completion of the first film-frame setting operation of FIG. 16. Therefore, only in the case of the rewind write operation, even if the photographic frame is not the first frame, does the control enter the release operation in which the single-rotation cam gear 50 starts rotation from the initial position (see the arrow B in FIG. 14, and FIG. 17). Further, in the case of the forced rewind operation after rewind write operation, the rotation of the single-rotation cam gear 50 starts from the initial position (see an arrow D' in FIG. 14, and FIG. 19).

[6. Multiple Exposure Operation]

Figure 24:
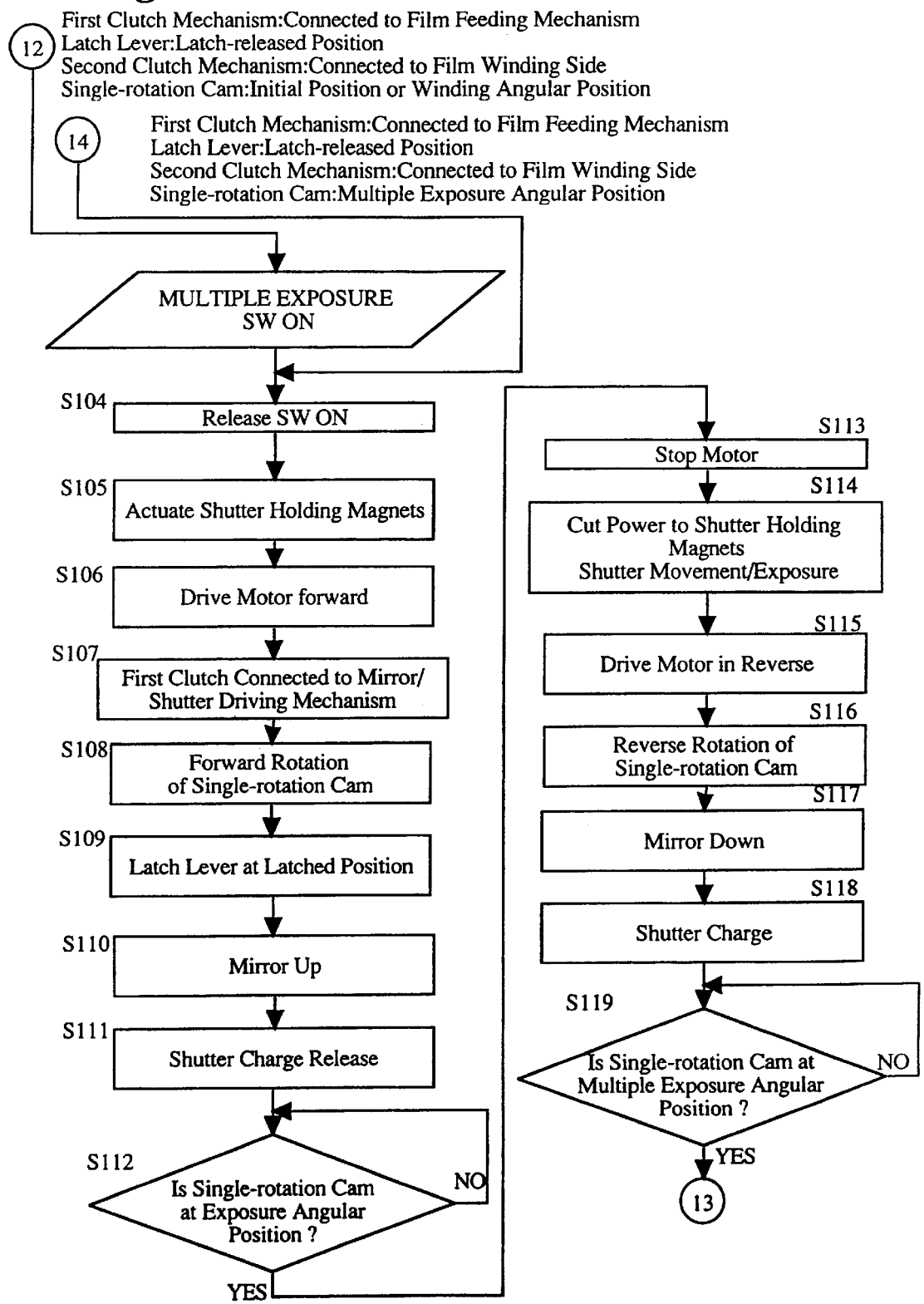
FIG. 24 is a flow chart of a former half of a multiple exposure operation according to the present invention.
Figure 25:
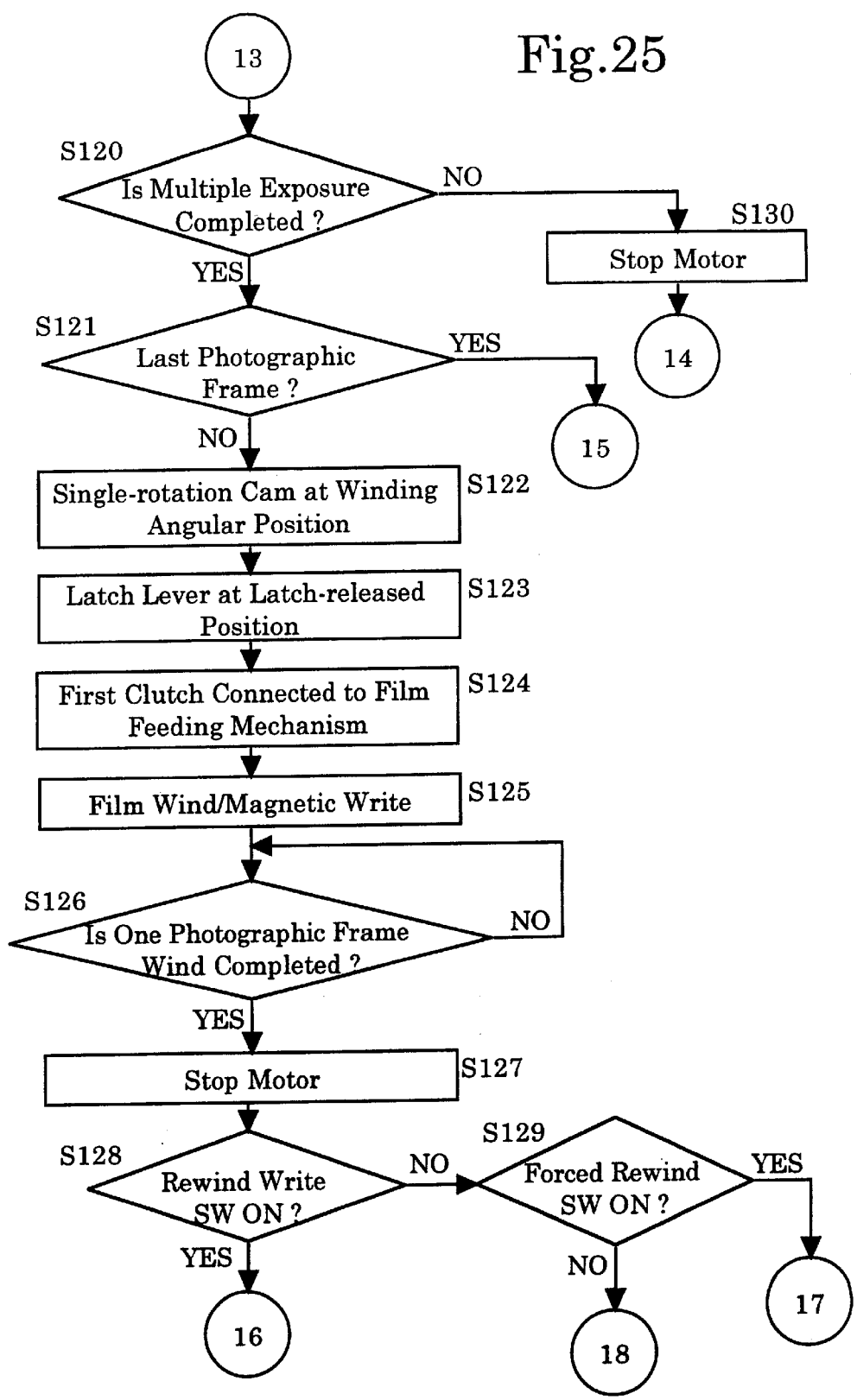
FIG. 25 is a flow chart of a latter half of the multiple exposure operation of FIG. 24 according to the present invention.

When the multiple exposure operation switch 84 is turned ON at step S17, namely, in the beginning of the photographing operation, the multiple exposure operation as illustrated in FIGS. 24 and 25 is executed. When the release switch 81 is turned ON after turning ON the multiple exposure operation switch 84, the motor 17 drives forward so that the single-rotation cam gear 50 can rotate forward, and the film F is exposed, similar to steps S18 through S40 of the release operation (steps S104 through S114). In this operation, if the current state is such that the photographic frame is at the first frame or that the rewind write operation is completed, the forward rotation of the single-rotation cam gear 50 (steps S108 through S113) starts from the initial position until reaching the exposure angular position (as shown by the arrow B in FIG. 14), and if the current state is such that the photographic frame is after the first frame, the forward rotation of the single-rotation cam gear 50 starts from the winding angular position until reaching the exposure angular position (as shown by the arrow B' in FIG. 14).

When the exposure is completed, the motor 17 reverses to rotate the single-rotation cam gear 50 in reverse, thereby the down operation of the mirror 70 and the shutter charge are carried out (steps S115 through S118). Apart from the ordinary release operation, the multiple exposure operation executes different operations depending on whether or not the multiple exposure in regard to the corresponding photographic frame has been completed when the single-rotation cam gear 50 reaches the multiple exposure rotation-position, namely when the detection brush 59 becomes in contact with the switch terminal 80d (step S119, FIG. 9).

When the multiple exposure is continued at step S120, the film F does not need to be wound, thus the motor 17 is stopped when the single-rotation cam gear 50 makes the reverse rotation as shown by an arrow E in FIG. 14, namely, the single-rotation cam gear 50 is at the multiple exposure rotation-position (step S130). At that time, when the release switch 81 is turned ON, the control is returned to step S104 to execute the exposure operation again. Operations from step S104 to step S120 can be repeated infinitely. However, from the second exposure, the single-rotation cam gear 50 starts the forward rotation not either from the initial position or from the winding angular position, but from the multiple exposure rotation-position (as shown by an arrow G in FIG. 14). Thus the latch lever 20 has been at the latched position from the beginning and the operation at step S109 is not executed.

On the other hand, when the multiple exposure is completed, the reverse driving of the motor 17 will not be stopped by turning ON the multiple exposure rotation switch. At step S121, if the current photographic frame is the last frame, the control proceeds to step S67 of the automatic rewind operation (FIG. 21), and if the current photographic frame is not at the last frame, the film F is wound to feed the next photographic frame and the control proceeds to step S122. During winding, as in the case of the release operation as described above, when the single-rotation cam gear 50 reaches the winding angular position through the reverse driving of the motor 17 (step S122), the latch lever 20 is moved to the latch-released position (step S123), thereby the first clutch mechanism is switched to engage with the film feeding mechanism 18 (step S124). Namely, although the single-rotation cam gear 50 is stopped after making the reverse rotation as shown by the arrow C in FIG. 14, the reverse driving of the motor 17 is continued. The reverse driving of the motor 17 winds the film F to execute the magnetic writing thereon (step S125), and after completion of winding by the amount of one photographic frame (step S126), the motor 17 is stopped (step S127) Since the state of each mechanism at step S127 is the same as that of step S40 (completion of the release operation), when the rewind write switch 83 is turned ON, the control enters the rewind write operation of FIGS. 22 and 23 (step S128), and when the forced rewind switch 82 is turned ON without turning ON the rewind write switch 83, the control enters the forced rewind operation of FIGS. 19 and 20 (step S129).

The above discussed embodiment has following advantageous points. Firstly, although the single-motor driving system is applied, the transmission mechanism can be simplified. In particular, all the operations as discussed above can be carried out by a simple mechanism composing two clutches having. planetary gears, the latch lever 20 and the force lever 76 to actuate each clutch, and the latch lever cam 74 and the force lever cam 75 provided on the single-rotation cam gear 50 to control the each lever. Further, the forward driving of the motor 17 carries out the mirror up operation and the shutter charge release operation, and the reverse driving of the motor 17 carries out the mirror down operation, the shutter charge operation, and the film feed (winding and rewinding) operation. Therefore the film can be wound after exposure without stopping the motor 17. With this structure, it is possible to increase the speed the film feeding speed in the photographing operation to be faster than the conventional single-motor driven camera.

Further, in regard to the reverse rotation of the single-rotation cam gear 50 starting from the exposure angular position, when there is a switch provided to detect the multiple exposure rotation-position, namely the angular position while the latch lever 20 is moved to the latch-released position after completion of the mirror down operation and the shutter charge operation, the motor 17 can be stopped when the single-rotation cam gear 50 reaches the multiple exposure rotation-position after completion of exposure, thus the film will not be fed and the multiple exposure can be carried out. In the above embodiment, the position to turn ON the multiple exposure rotation-position switch is arranged to be placed between the exposure angular position and the winding angular position in order to accomplish the speedy multiple exposure operations. However, it is possible to coincide the ON position of the multiple exposure operation switch with the winding angular position since the film will not be fed as long as the motor is stopped before the single-rotation cam gear 50 reaches the winding angular position at the latest.

Figure 28:
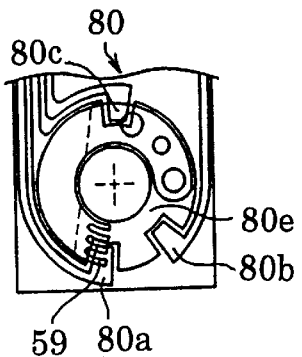
FIG. 28 is a plan view of an example of structure of a switch circuit board of a camera which does not perform a multiple exposure.
Figure 29:
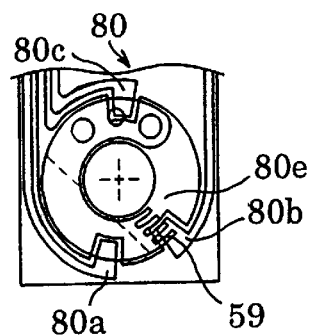
FIG. 29 is a plan view of an example of structure of a switch circuit board of a camera which does not perform the multiple exposure.
Figure 30:
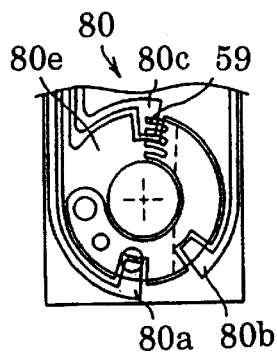
FIG. 30 is a plan view of an example of structure of a switch circuit board of a camera which does not perform the multiple exposure.
Figure 31:
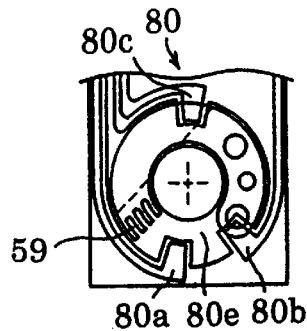
FIG. 31 is a plan view of an example of structure of a switch circuit board of a camera which does not perform the multiple exposure.

On the other hand, the single-lens reflex camera according to the present invention can be provided without a multiple exposure function. In this case, the multiple exposure operation switch 84 and the switch terminal 80d for detecting the multiple exposure rotation-position are not provided, and the control executes any operation other than the multiple exposure operation of FIGS. 24 and 25. In this case, step S17 of the ordinary release operation in FIG. 17 should also be ignored. FIGS. 28 through 31 illustrates examples of a switch circuit board 80' without having the switch terminal to detect the multiple exposure rotation-position, in which FIG. 28 shows the initial position of the single-rotation cam gear 50, FIG. 29 shows the rewinding angular position, FIG. 30 shows the exposure angular position, and FIG. 31 shows the winding angular position.

This embodiment especially relates to the motor-driven single-lens reflex camera an Advanced Photographic System, in which the film thrust (first film-frame setting) and the rewind write operations can be carried out by a simple structure. Therefore, if the initial thrust operation during loading of the film (FIG. 16) and the rewind write operation (FIGS. 22 and 23) are excluded from the above operation routines, the present invention may be applied to the conventional single-lens reflex camera using a 35 mm-type of film. In this case, since the magnetic writing operation (steps S38 and S100) or the parking position control of the cartridge spool 92 (step S61) is not required, the control can be executed by deleting these operations. In addition, although the rewind write operation in the above embodiment rewrites the magnetic information of the foregoing photographic frame (i.e., the frame just before the current frame), if a plurality of frames are recorded by connecting the film feeding control sensor 86 with the control circuit 100, it is possible to execute the rewind write operation up to the last two photographic frames.

Figure 32:
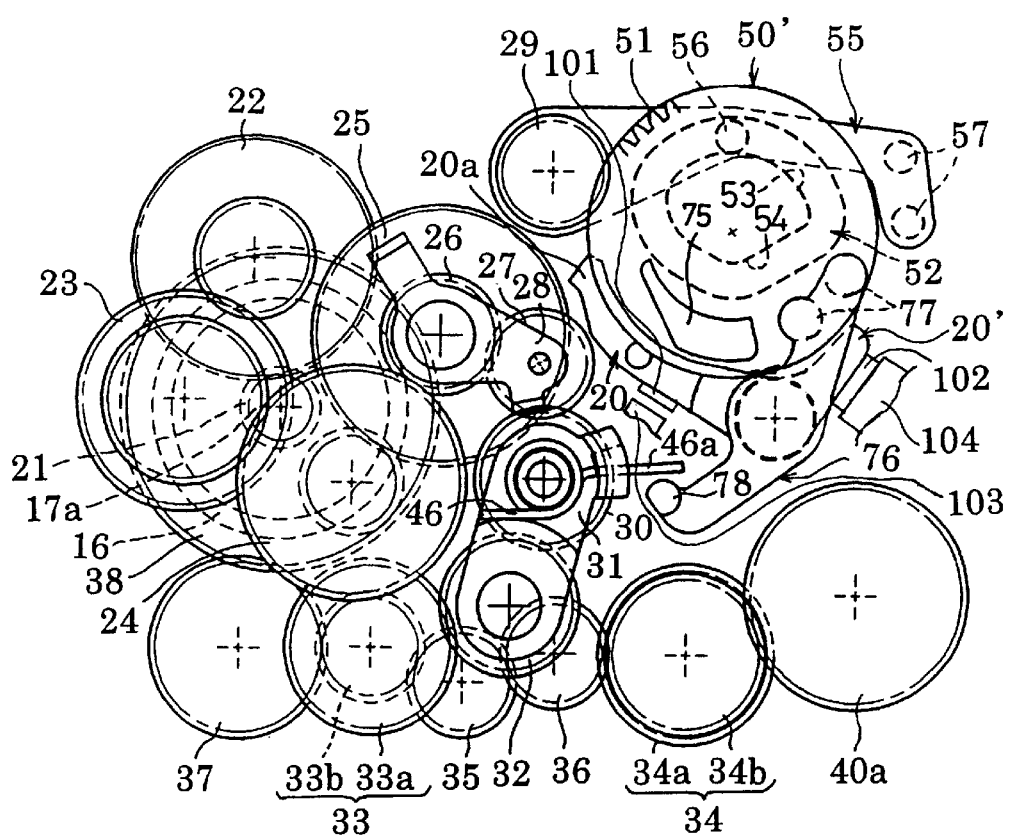
FIG. 32 is a plan view of a clutch mechanism which actuates a latch lever not by a cam gear but by electromagnets.

The structure of the clutch mechanisms may also be varied from those of the above embodiment. For example, according to the above embodiment, the single-rotation cam gear 50 cannot make the reverse rotation from the winding angular position, thus the single-rotation cam gear 50 should be rotated, from the winding angular position or the initial position, by passing through the exposure angular position once, to the rewinding angular position to prepare the rewind operation. Accordingly, during rewinding, the mirror up/down operations, the shutter charge release operation and the recharge operation should be carried out. Therefore, in order to avoid these operations, the latch lever 20 may be moved to the latched position as well as to the latch-released position by using the electromagnet, not by being engaged with the single-rotation cam gear 50. The mechanical structure of the clutch mechanism according to this embodiment is illustrated in FIG. 32, and the timing chart thereof is illustrated in FIG. 33. In this embodiment, a single-rotation cam gear 50' is not provided with a cam corresponding to the latch lever cam 74, and instead, a latch lever 20' is provided with a pair of permanent magnets 101 and 102, and a pair of electromagnets 103 and 104 opposing the permanent magnets 101 and 102 are provided adjacent to the latch lever 20'. The electromagnets 103 and 104 are known per se, which are actuated to attract the permanent magnet when the electric powers are supplied thereto. When the electromagnet 103 is actuated, the permanent magnet 101 is attracted thereto, thus the latch lever 20' is maintained at the latched position. Conversely, when the electromagnet 104 is actuated, the permanent magnet 102 is attracted, thus the latch lever 20' is moved to the latch-released position. The single-rotation cam gear 50' has a multiple exposure/winding angular position substantially located at the same position as the multiple exposure rotation-position as above described between the initial position and the exposure angular position, and this multiple exposure/winding angular position can electrically be detected through contact between the detection brush and the switch circuit board.

With this structure, since the movement of the latch lever 20' will not depend on the angular position of the single-rotation cam gear 50'. Therefore, when the single-rotation cam gear 50' is at the multiple exposure/winding angular position or at the initial position, if the permanent magnet 101 is attracted to the electromagnet 103, the latch lever 20' is maintained at the latched position. Thus the single-rotation cam gear 50' can rotate in reverse until reaching the rewinding angular position (as shown by arrows H and H' in FIG. 33). When the single-rotation cam gear 50' reaches the rewinding angular position, if the electric power supply to the electromagnet 103 is cut, and instead, if the power supply to the electromagnet 104 starts to attract the permanent magnet 102, the latch lever 20' is moved to the latch-released position, thus the reverse driving of the motor 17 is interlocked with the film feeding mechanism 18 to allow rewinding of the film F. Therefore, it is possible to execute the film rewind or the rewind write operation in a shorter time, without the operation of the mirror/shutter system, as well as without actuating the shutter holding magnets 89. Further, instead of the permanent magnet 101 and the electromagnet 103, the force may be applied to the latch lever 20' by a same type of spring as the torsion spring 20c, and the only the movement of the latch lever 20' to the latch-released position may be actuated by attracting the permanent magnet 102 to the electromagnet 104. As can be understood from FIG. 33, in the present embodiment, the winding angular position and the multiple exposure rotation-position correspond to each other. Accordingly, the amount of rotation of the single-rotation cam gear 50', etc., may slightly be different from that of the former embodiment.

As can be understood from the above discussion, according to the present invention, a single-lens reflex camera of which mirror/shutter driving system and film feeding system are both driven by a single motor can be provided in a simple structure, and hence the size and cost of camera can be minimized. Further, a faster-speed film feeding type of single-lens reflex camera, as compared with the conventional single-motor type of camera, can be attained. The present invention further provides a single-lens reflex camera which drives both the mirror/shutter driving system and the film feeding system by a single motor, which at the same time can perform the multiple exposure in a simple structure. Further, the present invention provides a single-motor driven single-lens reflex camera applied to the self-feeding film cartridge, which can rewrite the magnetic information in a simple structure.

Obvious changes may be made in the specific embodiments of the present invention described herein, such modifications being within the spirit and scope of the invention claimed.

What is claimed is:

1. A motor-driven single-lens reflex camera which controls and executes, through rotation of a single motor in a forward or a reverse direction, a mirror up operation, a mirror down operation and a shutter charge operation by a mirror/shutter driving system, and also a film winding operation and a film rewinding operation by a film feeding system, wherein:

said mirror up operation and a release of said shutter charge operation are executed through rotation of said motor in said forward direction, and said mirror down operation, said shutter charge operation, said film winding operation and said film rewinding operation are executed through rotation of said motor in said reverse direction.

2. The motor-driven single-lens reflex camera according to claim 1, further comprising:

a first clutch mechanism, including a latch lever movable between a clutch-engaged position and a clutch-disengagable position, which transmits driving of said motor to said mirror/shutter driving system in a direction corresponding to rotation of said motor in said forward or reverse direction when said latch lever is at said clutch-engaged position, and which engages said motor either with said mirror/shutter driving system or with said film driving system via switching thereto according to the rotation of said motor in said forward or reverse direction when said latch lever is at said clutch-disengagable position;

a second clutch mechanism, including a force lever movable between a winding position and a rewinding position, which engages said motor with a winding system when said force lever is at said winding position, and which switches said motor so as to be engaged with a rewinding system, in a state that said first clutch mechanism engages said motor with said film feeding system;

a rotating cam, which is rotated when said first clutch mechanism engages the rotation of said motor with said mirror/shutter driving system, which maintains a mirror down position and a shutter charge state at a charge position, and which lifts a mirror and releases said shutter charge state at an exposure angular position which is different from said charge position;

a force lever cam, provided in said rotating cam, which forcibly moves said force lever from said winding position to said rewinding position, when said rotating cam is at a rewinding angular position which is assigned at an angular position opposite to said exposure angular position with respect to the position of said charge position; and a latch lever moving means, which moves said latch lever to said clutch-engaged position when said rotating cam is at said exposure angular position, and which also moves said latch lever to said clutch-disengagable position when said rotating cam is either at said charge position or at said rewinding angular position, wherein, in a release operation, an exposure is executed by driving said motor in said forward direction so that said rotating cam is rotated in a forward direction to be moved from said charge position to said exposure angular position, then said mirror down operation and said shutter charge operation are executed by driving said motor in said reverse direction so that said rotating cam is rotated in a reverse direction to be moved from said exposure angular position to said charge position, and said film winding operation is executed by driving said motor in said reverse direction.

3. The motor-driven single-lens reflex camera according to claim 2, wherein said latch lever moving means comprises:

a spring member to apply force to said latch lever in order to set said latch lever at said clutch-engaged position; and a latch lever cam, provided in said rotating cam, which forcibly moves said latch lever from said clutch-engaged position to said clutch-disengagable position, when said rotating cam is either at said charge position or at said rewinding angular position.

4. The motor-driven single-lens reflex camera according to claim 3, further comprising an electromagnet to hold a shutter, wherein, in a film rewinding operation, said electromagnet is initially actuated so as to prevent a movement of said shutter, subsequently said motor is driven in said forward direction to rotate said rotating cam in said forward direction to be moved from said charge position to said rewinding angular position.

5. The motor-driven single-lens reflex camera according to claim 2, wherein said latch lever moving means comprises: an electromagnet device which moves said latch lever between said clutch-engaged position and said clutch-disengagable position without relying on rotation of said rotating cam.

6. The motor-driven single-lens reflex camera according to claim 5, wherein, in said film rewinding operation, said latch lever is initially moved to said clutch-engaged position when said rotating cam is at said charge position, subsequently said motor is driven in said reverse direction to move said rotating cam in said reverse direction from charge position to said rewinding angular position.

7. The motor-driven single-lens reflex camera according to claim 2, in which said first and second clutch mechanism are composed of planetary gear drives.

8. A motor-driven single-lens reflex camera for a self-feeding film cartridge, which controls and executes, through rotation of a single motor in a forward or a reverse direction, a mirror up operation, a mirror down operation and a shutter charge operation by a mirror/shutter driving system, and also a film winding operation and a film rewinding operation by a film feeding system, by using said self-feeding film cartridge, comprising:

a first clutch mechanism, including a latch lever movable between a clutch-engaged position and a clutch-disengagable position, which transmits driving of said motor to said mirror/shutter driving system in a direction corresponding to rotation of said motor in said forward or reverse direction when said latch lever is at said clutch-engaged position, and which engages said motor either with said mirror/shutter driving system or with said film driving system via switching thereto according to the rotation of said motor in said forward or reverse direction when said latch lever is at said clutch-disengagable position;

a second clutch mechanism, including a force lever movable between a winding position and a rewinding position, which engages said motor with a winding system when said force lever is at said winding position, and which switches said motor so as to be engaged with a rewinding system, in a state that said first clutch mechanism engages said motor with said film feeding system;

a rotating cam, which is rotated when said first clutch mechanism engages the rotation of said motor with said mirror/shutter driving system, which maintains a mirror down position and a shutter charge state at a charge position, and which lifts a mirror and releases said shutter charge state at an exposure angular position which is different from said charge position;

a force lever cam, provided in said rotating cam, which forcibly moves said force lever from said winding position to said rewinding position, when said rotating cam is at a rewinding angular position which is assigned at an angular position opposite to said exposure angular position with respect to the position of said charge position; and a latch lever moving means, which moves said latch lever to said clutch-engaged position when said rotating cam is at said exposure angular position, and which also moves said latch lever to said clutch-disengagable position when said rotating cam is either at said charge position or at said rewinding angular position wherein, in a release operation, an exposure is executed by driving said motor in said forward direction so that said rotating cam is rotated in a forward direction to be moved from said charge position to said exposure angular position, then said mirror down operation and said shutter charge operation are executed by driving said motor in said reverse direction so that said rotating cam is rotated in a reverse direction to be moved from said exposure angular position to said charge position, and said film winding operation is executed by driving said motor in said reverse direction; and in a first film-frame setting operation, said motor is initially driven in said forward direction to rotate said rotating cam from said rewinding angular position to said charge position, and subsequently, said motor is driven in said reverse direction.

9. The motor-driven single-lens reflex camera for a self-feeding film cartridge according to claim 8, further comprising:

a spring member to apply force to said latch lever in order to set said latch lever at said clutch-engaged position;

a latch lever cam, provided in said rotating cam, which forcibly moves said latch lever from said clutch-engaged position to said clutch-disengagable position, when said rotating cam is either at said charge position or at said rewinding angular position; and a magnetic head to carry out magnetic recording on magnetic layer of said film, wherein, in a magnetic record rewrite operation, said motor is initially driven in said forward direction to rotate said rotating cam in said forward direction to be moved from said charge position to said rewinding angular position, then said film rewinding operation is executed by driving said motor in said reverse direction, and after execution of said film rewinding operation, said motor is driven in said forward direction to rotate said rotating cam from said rewinding angular position to said charge position, then said film winding operation is executed by driving said motor in said reverse direction.

10. The motor-driven single-lens reflex camera for a self-feeding film cartridge according to claim 9, further comprising:

an electromagnet device to move said latch lever between said clutch-engaged position and said clutch-disengagable position without relying on rotation of said rotating cam; and a magnetic head to carry out magnetic recording on magnetic layer of said film, wherein, in a magnetic record rewrite operation, said latch lever is initially moved to said clutch-engaged position, then said motor is driven in said reverse direction to rotate said rotating cam in said reverse direction to be moved from said charge position to said rewinding angular position, then said latch lever is switched to said clutch-disengagable position when said rotating cam is at said rewinding angular position, and said film rewinding operation is executed by driving said motor in said reverse direction, and after execution of said film rewinding operation, said motor is driven in said forward direction to rotate said rotating cam from said rewinding angular position to said charge position, then said film winding operation is executed by driving said motor in said reverse direction.

11. A motor-driven single-lens reflex camera which controls and executes, through rotation of a single motor in a forward or a reverse direction, a mirror up operation, a mirror down operation and a shutter charge operation by a mirror/shutter driving system, and also a film winding operation and a film rewinding operation by a film feeding system, comprising:

a first clutch mechanism, including a latch lever movable between a clutch-engaged position and a clutch-disengagable position, which transmits driving of said motor to said mirror/shutter driving system in a direction corresponding to rotation of said motor in said forward or reverse direction when said latch lever is at said clutch-engaged position, and which engages said motor either with said mirror/shutter driving system or with said film driving system via switching thereto according to the rotation of said motor in said forward or reverse direction when said latch lever is at said clutch-disengagable position;

a second clutch mechanism, including a force lever movable between a winding position and a rewinding position, which engages said motor with a winding system when said force lever is at said winding position, and which switches said motor so as to be engaged with a rewinding system, in a state that said first clutch mechanism engages said motor with said film feeding system;

a rotating cam, which is rotated when said first clutch mechanism engages the rotation of said motor with said mirror/shutter driving system, which maintains a mirror down position and a shutter charge state at a charge position, and which lifts a mirror and releases said shutter charge state at an exposure angular position which is different from said charge position;

a force lever cam, provided in said rotating cam, which forcibly moves said force lever from said winding position to said rewinding position, when said rotating cam is at a rewinding angular position which is assigned at an angular position opposite to said exposure angular position with respect to the position of said charge position; and a latch lever moving means, which moves said latch lever to said clutch-engaged position when said rotating cam is at said exposure angular position, and which also moves said latch lever to said clutch-disengagable position when said rotating cam is either at said charge position or at said rewinding angular position, wherein, in a release operation, an exposure is executed by driving said motor in said forward direction so that said rotating cam is rotated in a forward direction to be moved from said charge position to said exposure angular position, then said mirror down operation and said shutter charge operation are executed by driving said motor in said reverse direction so that said rotating cam is rotated in a reverse direction to be moved from said exposure angular position to said charge position, and said film winding operation is executed by driving said motor in said reverse direction, and in a multiple exposure operation, after at least one exposure, said motor is initially driven in said reverse direction in order to execute said mirror down operation and said shutter charge operation, and subsequently, said motor is stopped.

12. The motor-driven single-lens reflex camera according to claim 11, wherein, during rotation of said rotating cam in said reverse direction to be moved from said exposure angular position, said mirror down operation and said shutter charge operation have been completed before said latch lever is moved to said clutch-disengagable position, and in said multiple exposure operation, said motor has been stopped before said latch lever is started to move to said clutch-disengagable position.

* * * * *